(12) United States Patent
Pearson et al.

(10) Patent No.: US 11,566,942 B1
(45) Date of Patent: Jan. 31, 2023

(54) DUPLEX WIDEBAND DIFFRACTION GRATING

(71) Applicant: Wasatch Photonics, Inc., Logan, UT (US)

(72) Inventors: Elroy Louis Pearson, Twin Lakes, WI (US); Dominic Speer, Providence, UT (US); Brandon N. Langedyke, Soda Springs, ID (US)

(73) Assignee: WASATCH PHOTONICS, INC., Logan, UT (US)

( * ) Notice: Subject to any disclaimer, the term of this patent is extended or adjusted under 35 U.S.C. 154(b) by 135 days.

(21) Appl. No.: 17/203,511

(22) Filed: Mar. 16, 2021

(51) Int. Cl.
*G01J 3/28* (2006.01)
*G01J 3/18* (2006.01)
*G02B 5/18* (2006.01)
*G03H 1/02* (2006.01)
*G02B 5/32* (2006.01)

(52) U.S. Cl.
CPC ............... *G01J 3/1838* (2013.01); *G01J 3/28* (2013.01); *G02B 5/1819* (2013.01); *G02B 5/32* (2013.01); *G03H 1/0248* (2013.01)

(58) Field of Classification Search
CPC .... G01J 3/1838; G01J 3/28; G01J 3/14; G01J 3/18; G01J 3/02; G02B 5/1819; G02B 5/32; G03H 1/0248
See application file for complete search history.

(56) References Cited

U.S. PATENT DOCUMENTS 5,363,220 A * 11/1994 Kuwayama .......... G02B 5/1857
359/569

* cited by examiner

*Primary Examiner* — Abdullahi Nur

(74) *Attorney, Agent, or Firm* — Ray Quinney & Nebeker P.C; James Bullough

(57) ABSTRACT

A duplex wideband grating includes a first diffraction element and a second diffraction element. The first diffraction element and the second diffraction element may reside in a single volume or in two separate volumes. The first diffraction element may include a first set of Bragg planes, and the second diffraction element may include a second set of Bragg planes. The first diffraction element may be designed to have a peak diffraction efficiency at a first wavelength, and the second diffraction element may be designed to have a peak diffraction efficiency at a second wavelength different from the first wavelength. The first diffraction element and the second diffraction element may be designed to achieve a same angle of dispersion between wavelengths. The duplex wideband grating may have a broader bandwidth with higher average diffraction efficiency across the broader bandwidth than either the first diffraction element or the second diffraction element.

20 Claims, 9 Drawing Sheets

DUPLEX WIDEBAND DIFFRACTION GRATING

CROSS-REFERENCE TO RELATED APPLICATIONS

N/A

BACKGROUND

An optical spectrometer is an instrument used to measure properties of electromagnetic radiation across a portion of the electromagnetic spectrum. The properties measured may be intensity or polarization state. Spectrometers are used in, among other fields, astronomy and chemistry. An optical spectrometer may measure how a sample absorbs, reflects, or scatters light. The optical spectrometer may include a detector that helps measure these interactions as a function of wavelength. Computer software may analyze data collected by the detector.

The optical spectrometer may include a dispersive element, such as a diffraction grating, to separate light into component wavelengths. The diffraction grating may use constructive and destructive interference to spatially separate polychromatic light into component wavelengths. The dispersive element may diffract certain wavelengths of light with greater efficiency than other wavelengths of light. The dispersive element may have a peak diffraction efficiency at a particular wavelength. Diffraction efficiency of the dispersive element may generally decrease as wavelengths become longer or shorter than the particular wavelength. A dispersive element may diffract a defined range of bandwidths approximately centered around the particular wavelength. To facilitate spectral analysis it may be desirable for the dispersive element to diffract a broad range of bandwidths with a high diffraction efficiency.

SUMMARY

In accordance with one aspect of the present disclosure, a diffraction grating is disclosed that includes a first non-symmetric diffraction element. The first non-symmetric diffraction element has a peak diffraction efficiency at a first wavelength. The diffraction grating also includes a second diffraction element. The second diffraction element has a peak diffraction efficiency at a second wavelength different from the first wavelength and wherein the diffraction grating has a first peak diffraction efficiency at the first wavelength and a second peak diffraction efficiency at the second wavelength.

The first non-symmetric diffraction element and the second diffraction element may be volume-phase holographic gratings.

The first non-symmetric diffraction element may include a first set of Bragg planes having a first tilt.

The second diffraction element may be a symmetric diffraction element.

The second diffraction element may be a non-symmetric diffraction element and may include a second set of Bragg planes having a second tilt different from the first tilt.

The first non-symmetric diffraction element and the second diffraction element may occupy a same volume.

The first non-symmetric diffraction element may occupy a first volume and the second diffraction element may occupy a second volume separate from the first volume.

The first volume may be adjacent to the second volume.

The first set of Bragg planes may have a spatial frequency of more than 900 lines per millimeter.

The first wavelength may be between 300 nm and 400 nm and the second wavelength may be between 650 nm and 750 nm.

The diffraction grating may further include a third non-symmetric diffraction element. The third non-symmetric diffraction element may have a peak diffraction efficiency at a third wavelength different from the first wavelength and the second wavelength. The diffraction grating may have a third peak diffraction efficiency at the third wavelength.

In accordance with another aspect of the present disclosure, a spectrometer is disclosed that includes an opening that receives light. The spectrometer also includes a diffraction grating that diffracts at least a portion of the light to generate diffracted light. The diffraction grating includes a first non-symmetric diffraction element. The first non-symmetric diffraction element has a peak diffraction efficiency at a first wavelength. The diffraction grating also includes a second diffraction element. The second diffraction element has a peak diffraction efficiency at a second wavelength different from the first wavelength. The diffraction grating has a first peak diffraction efficiency at the first wavelength and a second peak diffraction efficiency at the second wavelength. The spectrometer also includes a detector that receives at least a portion of the diffracted light.

The light may have a peak intensity at a peak wavelength and the second wavelength may be equal to the peak wavelength.

The second diffraction element may diffract the second wavelength away from the detector.

The first non-symmetric diffraction element and the second diffraction element may occupy a single volume.

In accordance with another aspect of the present disclosure, a diffraction grating is disclosed that includes a first non-symmetric volume phase holographic grating that has a first bandwidth. The diffraction grating also includes a second volume phase holographic grating that has a second bandwidth that is not identical to the first bandwidth. The diffraction grating has a third bandwidth that is broader than the first bandwidth and the second bandwidth.

The diffraction grating may have a higher average diffraction efficiency across the third bandwidth than either the first non-symmetric volume phase holographic grating or the second volume phase holographic grating.

The first non-symmetric volume phase holographic grating may include a first set of Bragg planes having a first index of refraction and the second volume phase holographic grating may be a non-symmetric volume phase holographic grating that includes a second set of Bragg planes having a second index of refraction different from the first index of refraction.

The first non-symmetric volume phase holographic grating may have a first spatial frequency, the second volume phase holographic grating may have a second spatial frequency, and the first spatial frequency may equal the second spatial frequency.

The first non-symmetric volume phase holographic grating may have a first angle of dispersion at an angle of incidence, the second volume phase holographic grating may have a second angle of dispersion at the angle of incidence, and the first angle of dispersion may equal the second angle of dispersion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
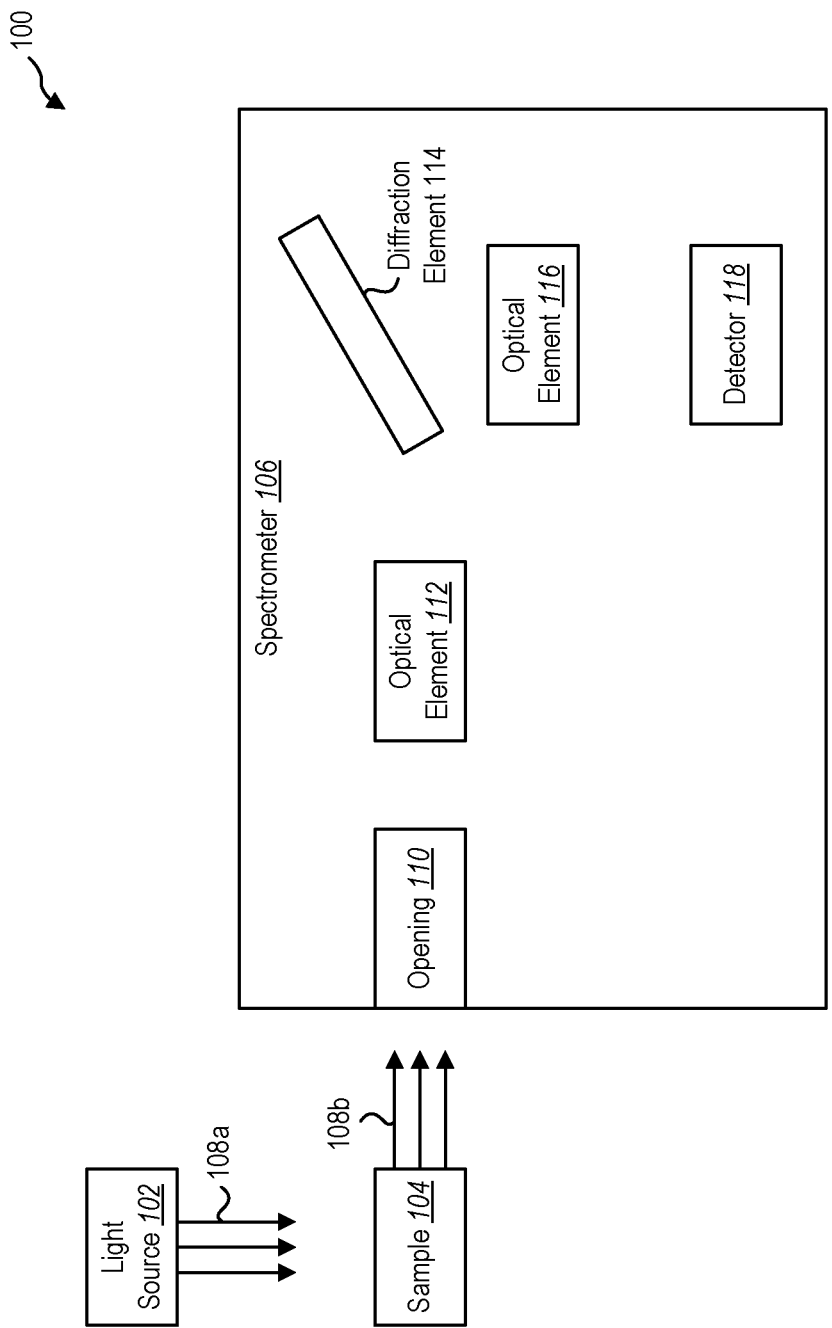
FIG. 1 illustrates an example spectrometer that includes a diffraction element that may be designed in accordance with this disclosure.

An optical spectrometer may be used to measure how electromagnetic radiation interacts with a sample. For example, an optical spectrometer may measure how a sample absorbs, reflects, or scatters light. An optical spectrometer may measure these interactions as a function of wavelength. To do so the optical spectrometer may include a dispersive element to separate polychromatic light into component wavelengths. The dispersive element may be a diffraction grating. The diffraction grating may use constructive and destructive interference to spatially separate polychromatic light into component wavelengths. One type of diffraction grating is a surface-relief diffraction grating. A surface-relief diffraction grating may include an optical surface that has surface features (such as equally spaced grooves) cut into the optical surface.

Another type of diffraction grating is a volume phase holographic grating (VPHG). A VPHG may not include any surface features. Instead, a VPHG may diffract light using index modulation. A VPHG may have an index modulation profile having a particular shape, such as a sinusoidal, a truncated sinusoidal, or a square wave. In other designs, a VPHG may include secondary surface relief structures that are not primary contributors to diffractive performance of the VPHG. A VPHG may include regions having a higher index of refraction than other regions of the VPHG. For example, a VPHG may include a set of repeating structures known as Bragg planes that diffract light. The Bragg planes may have a higher index of refraction than regions in between the Bragg planes. A VPHG may have a bulk index, which may be an average of the index of refraction of the Bragg planes and the index of refraction of the regions in between the Bragg planes. A VPHG may have an index modulation, which may be a difference between the index of refraction of the Bragg planes and the index of refraction of the regions in between the Bragg planes. The orientation of the Bragg planes may impact certain characteristics of the VPHG. For example, the Bragg planes may be oriented such that the VPHG is a symmetric grating. A symmetric grating diffracts a central wavelength at a first angle relative to the substrate normal (an angle of diffraction or AOD) that is the same as a second angle (an angle of incidence (AOI)) at which incoming light is incident to the grating. Tilting the Bragg planes may result in a VPHG that is non-symmetric. A non-symmetric grating diffracts a central wavelength at a first angle relative to the substrate normal that is different from a second angle at which light is incident to the grating.

In designing an optical spectrometer that includes a VPHG, a designer may consider at least three VPHG specifications or operating characteristics. The first two specifications may be a peak diffraction efficiency of the VPHG and, relatedly, a wavelength at which the peak diffraction efficiency occurs. Diffraction efficiency may be a measure of power throughput. Diffraction efficiency may be a measure of how much optical power is diffracted into one or more particular directions compared to an amount of optical power incident on a diffractive element. Diffraction efficiency may compare light that is diffracted in any direction to total incident light. In the alternative, diffraction efficiency may compare incident light that is diffracted into a first spatial diffraction order to total incident light. Diffraction efficiency may be measured as a ratio or a percentage. The diffraction efficiency of a diffractive element may vary based on a wavelength of incident light. In other words, diffraction efficiency of a diffractive element may be a function of wavelength. The peak diffraction efficiency of a diffractive element may refer to a highest diffraction efficiency of the diffractive element for a given range of wavelengths. The peak diffraction efficiency may occur at a particular wavelength. For example, a VPHG may have a peak diffraction efficiency of 85% at 570 nm. Diffraction efficiency may depend on a polarization of incident light. Diffraction efficiency may refer to an average diffraction efficiency for two or more polarizations of incident light. The wavelength at which the peak diffraction efficiency occurs and the value of the peak diffraction efficiency may impact a spectral bandwidth of the VPHG.

A third specification may be a spectral bandwidth of the VPHG. The spectral bandwidth of a diffractive element may refer to a range or set of wavelengths that the diffractive element diffracts with a diffraction efficiency above a threshold. In the alternative, the spectral bandwidth of a diffractive element may refer to a range of wavelengths that the diffractive element diffracts into a first order with a diffraction efficiency above a threshold. Because VPGHs are resonant optical structures, diffraction efficiency of a VPHG may peak at a particular wavelength and then roll off (decrease) for wavelengths longer and shorter than the particular wavelength. The spectral bandwidth of a VPHG may not include all wavelengths of interest. For example, it may be desirable for spectral analysis to diffract wavelengths ranging from 300 nm to 1000 nm into a first order with a diffraction efficiency of at least 10%. As noted in the example above, a VPHG may have a high peak diffraction efficiency (such as 85%) at 570 nm. But the diffraction efficiency of the VPHG may still drop below 10% for some wavelengths between 300 nm and 400 nm. One way to widen a spectral bandwidth of a VPHG in some instances is to decrease a thickness of the grating medium of the VPHG. But that approach has limits because making the grating medium too thin may cause the VPHG to diffract light into orders other than the first (or +1) order and thereby reduce diffraction efficiency.

This disclosure concerns a duplex wideband grating (DWG) that provides a wider spectral bandwidth (which may be referred to as a bandwidth or passband) than a VPHG and that provides better diffraction efficiency in a first order across the wider spectral bandwidth than a VPHG. The DWG may include two or more diffraction elements. The two or more diffraction elements may include two or more sets of Bragg planes. The two or more sets of Bragg planes may be non-symmetric. In other designs, one or more of the two or more sets of Bragg planes may be symmetric. The two or more sets of Bragg planes may transmit incident light. In other designs, the two or more sets of Bragg planes may diffract incident light in a reflection configuration. The two or more sets of Bragg planes may occupy a same volume or separate volumes. The two or more sets of Bragg planes may be designed to minimize interaction among the two or more sets of Bragg planes. The two or more sets of Bragg planes may have identical spatial frequencies but different tilts. The two or more sets of Bragg planes may achieve a same dispersion between wavelengths but have non-overlapping spectral bandwidths. Each set of Bragg planes in the two or more sets of Bragg planes may be designed to have a peak diffraction efficiency at a wavelength that is different from wavelengths at which other sets of Bragg planes in the two or more sets of Bragg planes have a peak diffraction efficiency. For example, a first set of Bragg planes may be designed to have a peak diffraction efficiency at 725 nm, and a second set of Bragg planes may be designed to have a peak diffraction efficiency at 350 nm. In this way, the DWG may have a wider spectral bandwidth (and may have better average and minimum diffraction efficiency across that spectral bandwidth) than a VPHG.

In addition to widening a spectral bandwidth, a spectral response of a DWG may be tailored to flatten a peak of a spectrometer light source. A spectrometer light source may have a central wavelength that is brighter than wavelengths at the ends of a passband. A DWG may be designed to include a first set of Bragg planes that has a narrow bandwidth centered on the central wavelength. The DWG may also include a second set of Bragg planes that has a broader bandwidth. The first set of Bragg planes may effectively act as a filter by diffracting away excess power of the central wavelength. The second set of Bragg planes may pass the "filtered" light to a detector for analysis.

FIG. 1 illustrates an example system 100. The system 100 may include a light source 102, a sample 104, and a spectrometer 106.

The light source 102 may be any device or system capable of emitting electromagnetic radiation. The electromagnetic radiation may include light composed of one or more wavelengths. The one or more wavelengths may cover a broad spectrum or a narrow spectrum. The one or more wavelengths may include ultraviolet wavelengths, visible wavelengths, and infrared wavelengths. The light source 102 may emit light 108a.

The sample 104 may include any substance capable of interacting with electromagnetic radiation. The sample 104 may interact with the light 108a. Interacting with the light 108a may include absorbing, reflecting, or scattering the light 108a. Light 108b may be a result of the sample 104 interacting with the light 108a. For example, the light 108b may include light that was not absorbed by the sample 104 or light that was reflected or scattered by the sample 104. Although the sample 104 is shown residing outside the spectrometer 106, in other designs, a spectrometer may be designed to house a sample inside the spectrometer.

The light 108b may enter the spectrometer 106 through an opening 110 of the spectrometer 106. Light that enters the spectrometer 106 may pass through optical element 112. The optical element 112 may be a lens system. The optical element 112 may direct light to diffraction element 114. The diffraction element 114 may use diffraction to disperse light incident on the diffraction element 114 into component wavelengths. The diffraction element 114 may be a transmissive diffraction grating. In alternative designs, a spectrometer may include a reflective diffraction grating. The diffraction element 114 may be oriented to receive light at a particular angle of incidence. For a given angle of incidence, the diffraction element 114 may diffract a central wavelength at an angle of diffraction and may achieve a particular angular dispersion (which may be a change in diffraction angle per unit wavelength). The diffraction element 114 may direct diffracted light to optical element 116. The diffraction element 114 may direct light diffracted in a first order to the optical element 116. The diffraction element 114 may pass a certain bandwidth of light to the optical element 116. It may be desirable for the diffraction element 114 to diffract a broad bandwidth of light with at least a minimum efficiency across the broad bandwidth to the optical element 116. The optical element 116 may direct light to detector 118. The detector 118 may measure optical power based on wavelength.

The arrangement of components included in the spectrometer 106 shown in FIG. 1 (such as the optical element 112, the diffraction element 114, the optical element 116, and the detector 118) is not limiting. A spectrometer may be designed to include more or fewer optical elements and may arrange the optical elements in a different way from what is shown in FIG. 1. Similarly, a spectrometer may include more than one diffraction element and may be designed to have one or more diffraction elements arranged differently from what is shown in FIG. 1. For example, a diffraction element may direct light directly to a detector.

The diffraction element 114 may include a volume phase holographic grating. The volume phase holographic grating may be a transmissive or transmission grating. In other designs, the volume phase holographic grating may be a reflection or reflective grating. Transmissive volume phase holographic gratings may allow low polarization dependent loss, high diffraction efficiency, and high dispersion. A volume phase holographic grating may not include any surface grooves or otherwise require any surface relief to diffract incident light. Instead, a volume phase holographic grating may diffract light using refractive index modulations. A volume phase holographic grating may have a sinusoidal index modulation profile, a truncated sinusoidal index modulation profile, a square wave index modulation profile, or an index modulation profile with a different shape. In other designs, a volume phase holographic grating may include secondary surface relief structures on a surface of the volume phase holographic grating. The secondary surface relief structures may not be a primary contributor to diffractive performance of the volume phase holographic grating. A volume phase holographic grating may use sequential blazed surface relief gratings. The volume phase holographic grating may include a thin layer of material (a medium) that includes alternating regions having different indexes of refraction. Specifically, along a length of the volume phase holographic grating, regions having high indexes of refraction (which may be Bragg planes) may be followed by regions having lower indexes of refraction. The volume phase holographic grating may have a bulk index and an index modulation. Depending on the index modulation of a volume phase holographic grating, the volume phase holographic grating may have a lower polarization dependence than a surface-relief grating. A volume phase holographic grating may be manufactured by exposing a medium (such as photo-thermo-refractive glass) to an interference pattern from an ultraviolet laser. The diffraction efficiency characteristics of a volume phase holographic grating may change based on an angle of incidence of incident light. A volume phase holographic grating may have a peak diffraction efficiency, a wavelength at which the peak diffraction efficiency occurs, and a bandwidth. Adjusting a thickness and index modulation of the medium of the volume phase holographic grating may change the wavelength at which the peak diffraction efficiency of the volume phase holographic grating occurs and the bandwidth of the volume phase holographic grating.

The diffraction element 114 may have a diffraction efficiency. The diffraction efficiency of the diffraction element 114 may be a measure of an amount of light that is diffracted by the diffraction element 114 compared to an amount of light incident on the diffraction element 114. The diffraction efficiency may be measured as a ratio or a percentage. The diffraction efficiency may compare total diffracted power to total incident power. Alternatively, the diffraction efficiency may compare diffracted power in a first order to total incident power. The diffraction efficiency of the diffraction element 114 may vary based on a wavelength of incident light. In other words, the diffraction element 114 may have a first diffraction efficiency for a first wavelength but may have a second, different diffraction efficiency for a second wavelength that is different from the first wavelength. The diffraction efficiency of the diffraction element 114 may vary based on polarization of incident light.

The diffraction element 114 may have a peak diffraction efficiency. The peak diffraction efficiency may be a highest diffraction efficiency of the diffraction element 114. The peak diffraction efficiency may occur at a particular wavelength. The diffraction efficiency of the diffraction element 114 may be less than the peak diffraction efficiency for all wavelengths other than the particular wavelength. In the alternative, a peak diffraction efficiency may occur when a diffraction efficiency of the diffraction element 114 at a particular wavelength is higher than diffraction efficiencies of wavelengths adjacent to the particular wavelength. In this case, the diffraction element 114 may have more than one peak diffraction efficiency.

The diffraction element 114 may have a bandwidth. The bandwidth of the diffraction element 114 may be a range or set of wavelengths for which the diffraction element 114 has a diffraction efficiency greater than a minimum threshold. The minimum threshold may be zero or greater than zero. The bandwidth may be for light diffracted in a first order.

The diffraction element 114 may include Bragg planes. The Bragg planes may have a higher index of refraction than regions of the diffraction element 114 in between the Bragg planes. The Bragg planes may allow the diffraction element 114 to diffract light incident on the diffraction element 114. The diffraction element 114 may have a bulk index and an index modulation. The diffraction element 114 may have an index modulation profile. The index modulation profile may have a shape, such as a sinusoidal, a truncated sinusoidal, a square wave, or a different shape.

The Bragg planes may have a spatial frequency. The spatial frequency may be a measure of a distance between Bragg planes. The spatial frequency may be a measure of how many pairs of high index of refraction regions (Bragg planes) and low index of refraction regions (regions in between the Bragg planes) are located in a millimeter long portion of the diffraction element 114 measured along a length of the diffraction element 114. For example, the diffraction element 114 may have a spatial frequency of 905 lines per millimeter. That may represent that the diffraction element 114 includes 905 Bragg planes and 905 regions having a lower index of refraction along a millimeter length of the diffraction element 114.

The Bragg planes may have an orientation or tilt relative to a surface of the diffraction element 114. The Bragg planes may have an orientation such that the diffraction element 114 has an angle of diffraction equal to an angle of incidence for a central wavelength. In the alternative, the Bragg planes may be tilted such that the diffraction element 114 has an angle of diffraction that is different from an angle of incidence.

The diffraction element 114 may include two or more diffraction elements. For example, the diffraction element 114 may include two or more sets of Bragg planes. The two or more sets of Bragg planes may be non-symmetric such that the diffraction element 114 diffracts a central wavelength at a first angle relative to a surface normal that is different from a second angle at which light is incident to the diffraction element 114. The two or more sets of Bragg planes may occupy a same volume. Alternatively, the two or more sets of Bragg planes may occupy two or more separate volumes. Each of the two or more separate volumes may be capable of functioning separately and independently as a diffraction grating. The two or more separate volumes may be arranged sequentially. Each separate volume may be adjacent to a preceding separate volume. Each set of Bragg planes in the two or more sets of Bragg planes may have at least one characteristic that is not identical to other sets of Bragg planes in the two or more sets of Bragg planes. For example, each set of Bragg planes in the two or more sets of Bragg planes may have different tilts and different indexes of refraction.

Each set of Bragg planes in the two or more sets of Bragg planes may be designed to minimize interaction among the two or more sets of Bragg planes. For example, a second set of Bragg planes may be designed to not diffract light (or diffract a certain maximum percentage of light) diffracted by a first set of Bragg planes. As another example, the two or more sets of Bragg planes may have a same spatial frequency. As another example, the two or more sets of Bragg planes may have a same angle of dispersion for a given angle of incidence.

Each set of Bragg planes in the two or more sets of Bragg planes may be designed such that the diffraction element 114 has a broader bandwidth than any single set of Bragg planes in the two or more sets of Bragg planes (in a situation in which the single set of Bragg planes is operating independently). For example, a first set of Bragg planes in the two or more sets of Bragg planes may be tuned to favor longer wavelengths while a second set of Bragg planes in the two or more sets of Bragg planes may be tuned to favor shorter wavelengths. The first set of Bragg planes may have a peak diffraction efficiency at a first wavelength, and the second set of Bragg planes may have a peak diffraction efficiency at a second wavelength. The first wavelength may be longer than the second wavelength. The first set of Bragg planes may have a first bandwidth, and the second set of Bragg planes may have a second bandwidth. The first bandwidth may include wavelengths (such as certain longer wavelengths) not included in the second bandwidth, and the second bandwidth may include wavelengths (such as certain shorter wavelengths) not included in the first bandwidth. As a result, the diffraction element 114 may have a bandwidth that covers a broader range of wavelengths than the first set of Bragg planes or the second set of Bragg planes.

Each set of Bragg planes in the two or more sets of Bragg planes may be designed such that the diffraction element 114 has a higher average diffraction efficiency over a given bandwidth than any single set of Bragg planes in the two or more sets of Bragg planes. A first set of Bragg planes may diffract a first set of wavelengths of light with a higher average diffraction efficiency than a second set of Bragg planes diffracts the first set of wavelengths of light. The second set of Bragg planes may diffract a second set of wavelengths of light with a higher average diffraction efficiency than the first set of Bragg planes diffracts the second set of wavelengths of light. As a result, the diffraction element 114 may diffract a third set of wavelengths that includes all wavelengths in the first set of wavelengths and the second set of wavelengths with a higher average diffraction efficiency than either the first set of Bragg planes or the second set of Bragg planes diffracts the third set of wavelengths.

Each set of Bragg planes in the two or more sets of Bragg planes may be designed such that the diffraction element 114 has a higher minimum diffraction efficiency across a given bandwidth than any single set of Bragg planes in the two or more sets of Bragg planes. A first set of Bragg planes may have a first minimum diffraction efficiency across a first set of wavelengths of light that is higher than a minimum diffraction efficiency of a second set of Bragg planes across the first set of wavelengths. The second set of Bragg planes may have a second minimum diffraction efficiency across a second set of wavelengths of light that is higher than a minimum diffraction efficiency of the first set of Bragg planes across the second set of wavelengths. As a result, the diffraction element 114 may have a third minimum diffraction efficiency across a third set of wavelengths that includes all wavelengths in the first set of wavelengths and the second set of wavelengths that is higher than a minimum diffraction efficiency of either the first set of Bragg planes or the second set of Bragg planes across the third set of wavelengths.

The two or more sets of Bragg planes may be designed to shape a spectral response of the diffraction element 114. For example, assume light incident on the diffraction element 114 includes a bright spike at a particular wavelength. A first set of Bragg planes of the two or more sets of Bragg planes may be designed to have a peak diffraction efficiency at the particular wavelength. The first set of Bragg planes may have a narrow bandwidth centered around the particular wavelength. In this way, the first set of Bragg planes may diffract away photons at the particular wavelength and reduce output power at the particular wavelength. The first set of Bragg planes may act similar to a filter in this instance. A second set of Bragg planes may have a broader bandwidth and diffract the light incident on the diffraction element 114 toward the detector 118.

Figure 2:
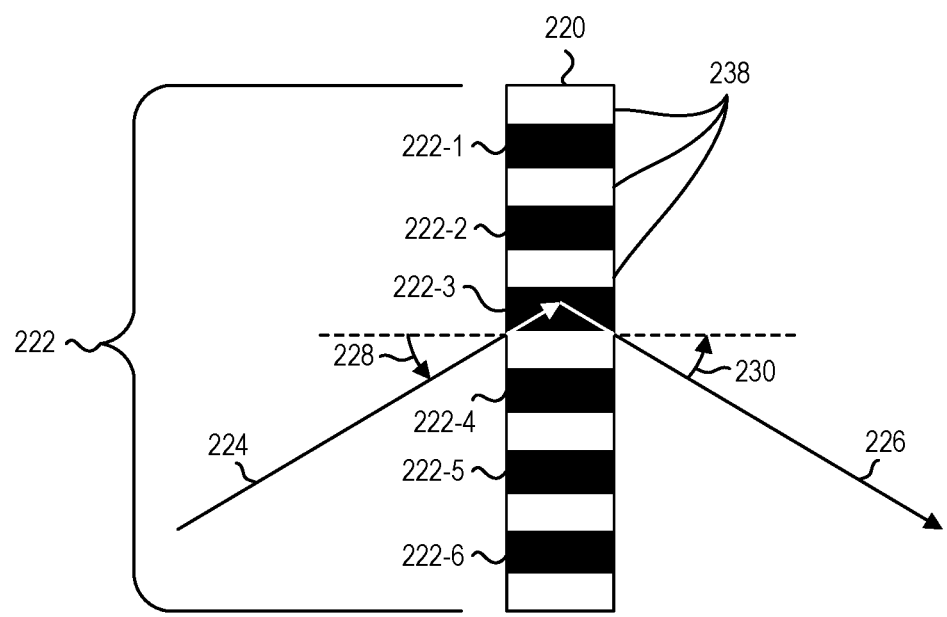
FIG. 2 illustrates an example symmetric volume phase holographic grating.

FIG. 2 illustrates an example volume phase holographic grating 220. The volume phase holographic grating 220 may include Bragg planes 222. The Bragg planes may diffract light. The Bragg planes 222 may include Bragg planes 222-1, 222-2, 222-3, 222-4, 222-5, 222-6. The Bragg planes 222 may reside inside a volume of the volume phase holographic grating 220. The Bragg planes 222 may have an index of refraction. The volume phase holographic grating 220 may include regions (such as regions 238) in between the Bragg planes 222. The index of refraction of the Bragg planes 222 may be higher than an index of refraction of the regions in between the Bragg planes 222. The volume phase holographic grating 220 may have a bulk index. The bulk index of the volume phase holographic grating 220 may be an average of the index of refraction of the Bragg planes 222 and the index of refraction of the regions in between the Bragg planes 222. The volume phase holographic grating 220 may have an index modulation. The index modulation of the volume phase holographic grating 220 may be a difference between the index of refraction of the Bragg planes 222 and the index of refraction of the regions in between the Bragg planes 222. The volume phase holographic grating 220 may have an index modulation profile. The index modulation profile may have a shape, such as a sinusoidal, a truncated sinusoidal, or a square wave.

Incident light 224 may enter the volume phase holographic grating 220 at a point of incidence. An angle of incidence 228 may be an angle between the incident light 224 and a line perpendicular to a surface of the volume phase holographic grating 220 at the point of incidence. The Bragg planes 222 may diffract the incident light 224 to generate diffracted light 226. A center wavelength of the diffracted light 226 may exit the volume phase holographic grating 220 at an angle of diffraction 230 relative to a line perpendicular to a surface of the volume phase holographic grating 220. The Bragg planes 222 may disperse light received at the angle of incidence 228 at a particular angle of dispersion.

The Bragg planes 222 may have an orientation (which may also be referred to as a tilt). Each of the Bragg planes 222 may have an identical orientation. The Bragg planes 222 may be oriented such that the angle of diffraction 230 equals the angle of incidence 228. When the Bragg planes 222 are oriented such that the angle of diffraction 230 equals the angle of incidence 228, the volume phase holographic grating 220 (or the Bragg planes 222) may be referred to as symmetric.

The volume phase holographic grating 220 may have a diffraction efficiency. The diffraction efficiency of the volume phase holographic grating 220 may be a function of wavelength. In other words, the diffraction efficiency of the volume phase holographic grating 220 may vary depending on a wavelength of incident light. A thickness of a medium of the volume phase holographic grating 220 may impact the diffraction efficiencies of the volume phase holographic grating 220.

The volume phase holographic grating 220 may have one or more peak diffraction efficiencies. The one or more peak diffraction efficiencies may occur at one or more particular wavelengths. The volume phase holographic grating 220 may be designed to have one or more characteristics that result in the volume phase holographic grating 220 having the one or more peak diffraction efficiencies at the one or more particular wavelengths. For example, the volume phase holographic grating 220 may be designed to have a peak diffraction efficiency at 720 nm. In the alternative, the volume phase holographic grating 220 may be designed to have a peak diffraction efficiency at 350 nm.

The volume phase holographic grating 220 may have a bandwidth. The bandwidth of the volume phase holographic grating 220 may be a set of wavelengths for which the diffraction efficiency of the volume phase holographic grating 220 is greater than a threshold. For example, the bandwidth of the volume phase holographic grating 220 may be a set of wavelengths for which the diffraction efficiency of the volume phase holographic grating 220 is greater than zero. The bandwidth of the volume phase holographic grating 220 may depend on a thickness of a medium of the volume phase holographic grating 220. The volume phase holographic grating 220 may be designed to have one or more characteristics that result in the volume phase holographic grating 220 having a bandwidth that includes a particular set of wavelengths.

Although FIG. 2 shows the volume phase holographic grating 220 transmitting the incident light 224, in other designs a volume phase holographic grating may diffract the incident light 224 in a reflection configuration. Whether a volume phase holographic grating is a reflection volume phase holographic grating may depend on an orientation of Bragg planes included in the volume phase holographic grating. A reflection volume phase holographic grating may have an orientation, diffraction efficiency, one or more peak diffraction efficiencies, and a bandwidth as described above with respect to the volume phase holographic grating 220. A reflection volume phase holographic grating may be symmetric such that an angle of diffraction equals an angle of incidence.

Figure 3:
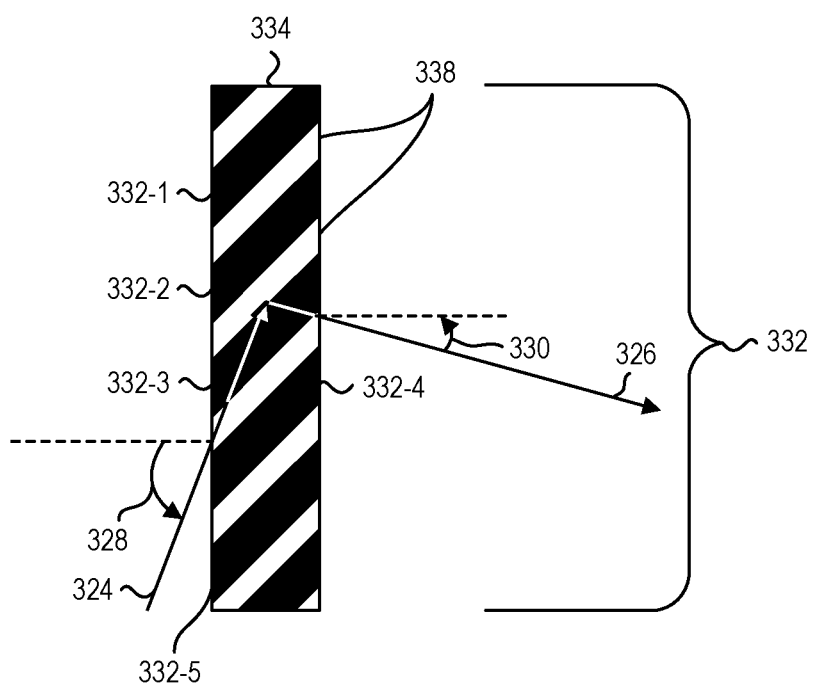
FIG. 3 illustrates an example non-symmetric volume phase holographic grating.

FIG. 3 illustrates an example volume phase holographic grating 334. The volume phase holographic grating 334 may include tilted Bragg planes 332. The tilted Bragg planes 332 may include tilted Bragg planes 332-1, 332-2, 332-3, 332-4, 332-5. The tilted Bragg planes 332 may reside inside a volume of the volume phase holographic grating 334. The tilted Bragg planes 332 may have an index of refraction. The volume phase holographic grating 334 may include regions (such as regions 338) in between the tilted Bragg planes 332. The regions in between the titled Bragg planes 332 may have an index of refraction different from the index of refraction of the tilted Bragg planes 332. The index of refraction of the tilted Bragg planes 332 may be higher than the index of refraction of the regions in between the titled Bragg planes 332. The volume phase holographic grating 334 may have a bulk index and an index modulation. The volume phase holographic grating 334 may have an index modulation profile. The index modulation profile may have a shape, such as a sinusoidal, a truncated sinusoidal, or a square wave.

Incident light 324 may enter the volume phase holographic grating 334 at a point of incidence. An angle of incidence 328 may be an angle between the incident light 324 and a line perpendicular to a surface of the volume phase holographic grating 334 at the point of incidence. The tilted Bragg planes 332 may diffract the incident light 324 to generate diffracted light 326. A center wavelength of the diffracted light 326 may exit the volume phase holographic grating 334 at an angle of diffraction 330 relative to a line perpendicular to a surface of the volume phase holographic grating 334. The tilted Bragg planes 332 may disperse light received at the angle of incidence 328 at a particular angle of dispersion.

The tilted Bragg planes 332 may have an orientation. Each of the tilted Bragg planes 332 may have an identical orientation. The tilted Bragg planes 332 may have an orientation relative to a surface of the volume phase holographic grating 334 that is different from the orientation of the Bragg planes 222 relative to the surface of the volume phase holographic grating 220. The tilted Bragg planes 332 may be oriented such that the angle of diffraction 330 is different from the angle of incidence 328. When the tilted Bragg planes 332 are oriented such that the angle of incidence 328 is different from the angle of diffraction 330, the volume phase holographic grating 334 (or the tilted Bragg planes 332) may be referred to as non-symmetric.

The volume phase holographic grating 334 may have a diffraction efficiency. The diffraction efficiency of the volume phase holographic grating 334 may be a function of wavelength. In other words, the diffraction efficiency of the volume phase holographic grating 334 may vary depending on a wavelength of incident light. A thickness of a medium of the volume phase holographic grating 334 may impact the diffraction efficiencies of the volume phase holographic grating 334.

The volume phase holographic grating 334 may have one or more peak diffraction efficiencies. The one or more peak diffraction efficiencies may occur at one or more particular wavelengths. The volume phase holographic grating 334 may be designed to have one or more characteristics that result in the volume phase holographic grating 334 having the one or more peak diffraction efficiencies at the one or more particular wavelengths. For example, the volume phase holographic grating 334 may be designed to have a peak diffraction efficiency at 350 nm. In the alternative, the volume phase holographic grating 334 may be designed to have a peak diffraction efficiency at 720 nm.

The volume phase holographic grating 334 may have a bandwidth. The bandwidth of the volume phase holographic grating 334 may be a set of wavelengths for which the diffraction efficiency of the volume phase holographic grating 334 is greater than a threshold. The bandwidth of the volume phase holographic grating 334 may depend on a thickness of a medium of the volume phase holographic grating 334. The volume phase holographic grating 334 may be designed to have one or more characteristics that result in the volume phase holographic grating 334 having a bandwidth that includes a particular set of wavelengths.

Although the volume phase holographic grating 334 shown in FIG. 3 transmits the incident light 324, in other designs a volume phase holographic grating may diffract incident light in a reflection configuration. A reflection volume phase holographic grating may have an orientation, diffraction efficiency, one or more peak diffraction efficiencies, and a bandwidth as described above with respect to the volume phase holographic grating 334. A reflection volume phase holographic grating may be non-symmetric such that an angle of diffraction is different from an angle of incidence.

Figure 4A:
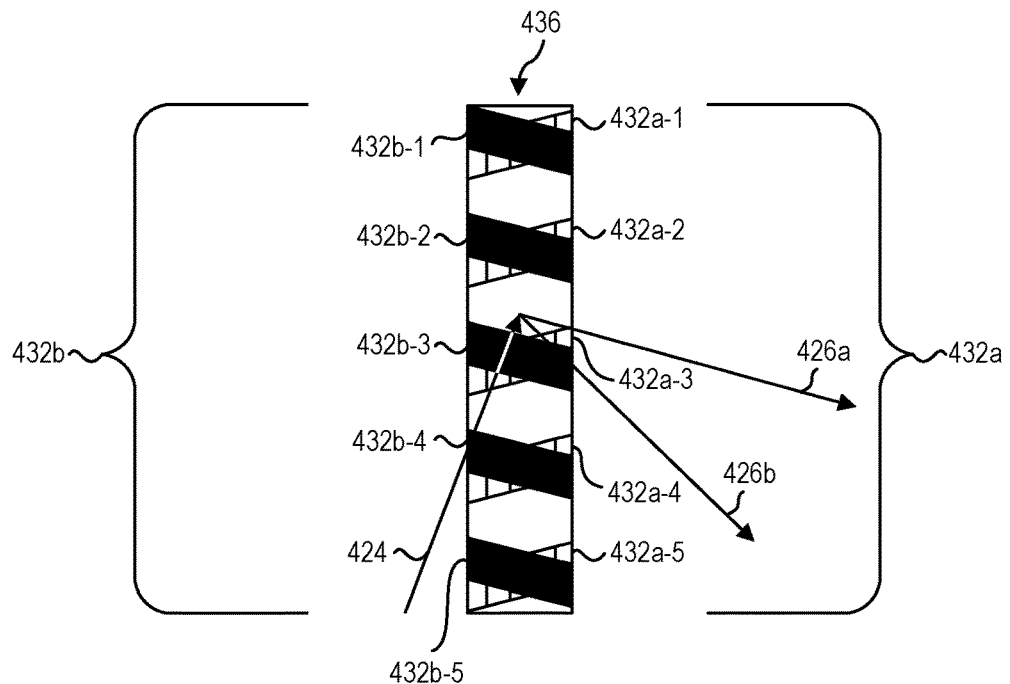
FIG. 4A illustrates an example duplex wideband grating in which two sets of non-symmetric Bragg planes are located in a single volume.

FIG. 4A illustrates an example duplex wideband grating 436. The duplex wideband grating 436 may have a wider bandwidth than the volume phase holographic grating 220 and the volume phase holographic grating 334.

The duplex wideband grating 436 may include two diffraction elements, a first diffraction element and a second diffraction element. In other designs, a duplex wideband grating may include three or more diffraction elements. The first diffraction element may include a first volume phase holographic grating. The second diffraction element may include a second volume phase holographic grating.

The first diffraction element and the second diffraction element may be designed to minimize interaction between the first diffraction element and the second diffraction element. For example, the first diffraction element and the second diffraction element may have identical angles of dispersion for a given angle of incidence. As another example, the first diffraction element and the second diffraction element may have identical spatial frequencies.

The two diffraction elements may have one or more non-identical operating characteristics designed to improve certain operating characteristics of the duplex wideband grating 436 as compared to either the first diffraction element or the second diffraction element. For example, the first diffraction element may be designed to have a first peak diffraction efficiency at a first wavelength. The second diffraction element may be designed to have a second peak diffraction efficiency at a second wavelength. The first wavelength may be different from the second wavelength. As a result, the duplex wideband grating 436 may have peak diffraction efficiencies at the first wavelength and the second wavelength. As another example, the first diffraction element may be designed to have a first bandwidth. The second diffraction element may be designed to have a second bandwidth. The first bandwidth may be different from the second bandwidth. As a result, the duplex wideband grating 436 may have a third bandwidth that is broader than either the first bandwidth or the second bandwidth. Furthermore, the duplex wideband grating 436 may have a higher average diffraction efficiency across the third bandwidth than either the first diffraction element or the second diffraction element has across the third bandwidth. The duplex wideband grating 436 also may have a higher minimum diffraction efficiency across the third bandwidth than either the first diffraction element or the second diffraction element has across the third bandwidth.

The two diffraction elements may include two sets of Bragg planes. For example, the duplex wideband grating 436 may include Bragg planes 432a, 432b. The Bragg planes 432a, 432b may both reside in a single volume or medium. The Bragg planes 432a may intersect with the Bragg planes 432b within the single volume or medium of the duplex wideband grating 436. The Bragg planes 432a, 432b may be non-symmetric or tilted. The Bragg planes 432a may include Bragg planes 432a-1, 432a-2, 432a-3, 432a-4, 432a-5. The Bragg planes 432b may include Bragg planes 432b-1, 432b-2, 432b-3, 432b-4, 432b-5.

The Bragg planes 432a may have a first orientation relative to a surface of the duplex wideband grating 436. The Bragg planes 432b may have a second orientation relative to a surface of the duplex wideband grating 436. The first orientation may be different from the second orientation. The first orientation may impact operating characteristics of the Bragg planes 432a. The second orientation may impact operating characteristics of the Bragg planes 432b. The operating characteristics may include diffraction efficiency, bandwidth, one or more peak diffraction efficiencies, one or more particular wavelengths at which the one or more peak diffraction efficiencies occur, angle of dispersion, and angle of diffraction.

The Bragg planes 432a may have a first spatial frequency. The Bragg planes 432b may have a second spatial frequency. The first spatial frequency may be equal to the second spatial frequency. The first spatial frequency and the second spatial frequency may impact the operating characteristics of the Bragg planes 432a and the Bragg planes 432b respectively.

The Bragg planes 432a may have a first index of refraction. The Bragg planes 432b may have a second index of refraction. The regions between the Bragg planes 432a and the regions between the Bragg planes 432b may have a third index of refraction lower than the first index of refraction and the second index of refraction. The first index of refraction may be different from the second index of refraction. The first index of refraction and the second index of refraction may impact the operating characteristics of the Bragg planes 432a and the Bragg planes 432b respectively. A first difference may exist between the first index of refraction and the third index of refraction. A second difference may exist between the second index of refraction and the third index of refraction. The first difference and the second difference may impact the operating characteristics of the Bragg planes 432a and the Bragg planes 432b respectively. A first average may exist between the first index of refraction and the third index of refraction. A second average may exist between the second index of refraction and the third index of refraction. The first average and the second average may impact operating characteristics of the Bragg planes 432a and the Bragg planes 432b respectively.

Incident light 424 may enter the duplex wideband grating 436. The duplex wideband grating 436 may diffract the incident light 424 to generate diffracted light 426a, 426b. The Bragg planes 432a may diffract the incident light 424 to generate the diffracted light 426a. The Bragg planes 432b may diffract the incident light 424 to generate the diffracted light 426b. The diffracted light 426a may have an angle of diffraction different from an angle of incidence of the incident light 424. The diffracted light 426b may have an angle of diffraction different from the angle of incidence of the incident light 424. The diffracted light 426a may have an angle of diffraction different from an angle of diffraction of the diffracted light 426b.

The Bragg planes 432a, 432b may be designed to minimize interaction between the Bragg planes 432a and the Bragg planes 432b. For example, the Bragg planes 432a, 432b may be designed such that the Bragg planes 432a diffract incident light with a same dispersion between wavelengths as the Bragg planes 432b. As another example, the Bragg planes 432a, 432b may be designed such that the Bragg planes 432a diffract a first portion of spectrum and the Bragg planes 432b diffract a second portion of the spectrum that is not identical to the first portion. As another example, the Bragg planes 432b may be designed to not diffract light (or to diffract light with a diffraction efficiency below a threshold) that is diffracted by the Bragg planes 432a.

The duplex wideband grating 436 may have a diffraction efficiency. The diffraction efficiency of the duplex wideband grating 436 may be different from a diffraction efficiency of the Bragg planes 432a. The diffraction efficiency of the duplex wideband grating 436 may be different from a diffraction efficiency of the Bragg planes 432b. The Bragg planes 432a may have a diffraction efficiency different from a diffraction efficiency of the Bragg planes 432b.

The duplex wideband grating 436 may have two or more peaks in diffraction efficiency. The Bragg planes 432a may have a peak diffraction efficiency at a first wavelength. The Bragg planes 432b may have a peak diffraction efficiency at a second wavelength. In a situation in which the Bragg planes 432a, 432b were operating independently of each other, the peak diffraction efficiencies of the Bragg planes 432a, 432b may exceed a defined threshold (such as 75%). The Bragg planes 432a, 432b may be designed such that the first wavelength is different from the second wavelength and such that a difference of the first wavelength and the second wavelength is greater than a defined threshold. As a result, the duplex wideband grating 436 may have two or more peaks in diffraction efficiency and the two or more peaks may have diffraction efficiencies that meet or exceed a defined threshold. Moreover, the duplex wideband grating 436 may have two or more peaks in diffraction efficiency that occur at wavelengths that have a difference greater than a defined threshold. For example, the Bragg planes 432a, 432b may be designed such that the duplex wideband grating 436 has two peaks in diffraction efficiency that are above 65%. In other designs, a threshold diffraction efficiency of the two peaks may be higher or lower than 65%. The Bragg planes 432a, 432b may be designed such that the wavelengths corresponding to the two peaks have a difference that exceeds 350 nm. In other designs, the difference between the wavelengths may be more or less than 350 nm.

The duplex wideband grating 436 may have a bandwidth. The bandwidth of the duplex wideband grating 436 may be different from a bandwidth of the Bragg planes 432a. The bandwidth of the duplex wideband grating 436 may be different from a bandwidth of the Bragg planes 432b. The Bragg planes 432a, 432b may be designed such that the duplex wideband grating 436 has a wider bandwidth than the Bragg planes 432a or the Bragg planes 432b in a situation in which the Bragg planes 432a, 432b operate independently. For example, assume that when operating independently, the Bragg planes 432a may have a diffraction efficiency above 35% for at least wavelengths from 300 nm to 575 nm. Assume that when operating independently, the Bragg planes 432b may have a diffraction efficiency above 35% for at least wavelengths from 325 nm to 350 nm and from 510 nm to 1000 nm. In that case, the duplex wideband grating 436 may have a diffraction efficiency above 35% for at least wavelengths from 300 nm to 1000 nm.

The duplex wideband grating 436 may have a higher average diffraction efficiency in a first order across a defined bandwidth (such as the bandwidth of the duplex wideband grating 436) than the Bragg planes 432a and the Bragg planes 432b in a situation in which the Bragg planes 432a, 432b were operating independently.

The duplex wideband grating 436 may have a minimum diffraction efficiency within a defined bandwidth. The minimum diffraction efficiency may be greater than a minimum diffraction efficiency within the defined bandwidth of the Bragg planes 432a in a situation in which the Bragg planes 432a are operating independently. The minimum diffraction efficiency may be greater than a minimum diffraction efficiency within the defined bandwidth of the Bragg planes 432b in a situation in which the Bragg planes 432b are operating independently. For example, the duplex wideband grating 436 may have a minimum diffraction efficiency of 35% within a bandwidth of 300 nm to 1000 nm. The minimum diffraction efficiency within that bandwidth of the Bragg planes 432a may be approximately 0%. The minimum diffraction efficiency within that bandwidth of the Bragg planes 432b may be approximately 4%.

Although the duplex wideband grating 436 shown in FIG. 4A transmits the incident light 424, in other designs a duplex wideband grating may diffract incident light in a reflection configuration. For example, in FIG. 4B a duplex wideband grating 436b may include a first diffraction element and a second diffraction element in a single volume. The first diffraction element may be a reflection volume phase holographic grating, and the second diffraction element may be a reflection volume phase holographic grating. The first diffraction element may include Bragg planes 432c (which may include Bragg planes 432c-1, 432c-2, 432c-3), and the second diffraction element may include Bragg planes 432d (which may include Bragg planes 432d-1, 432d-2, 432d-3).

Figure 4B:
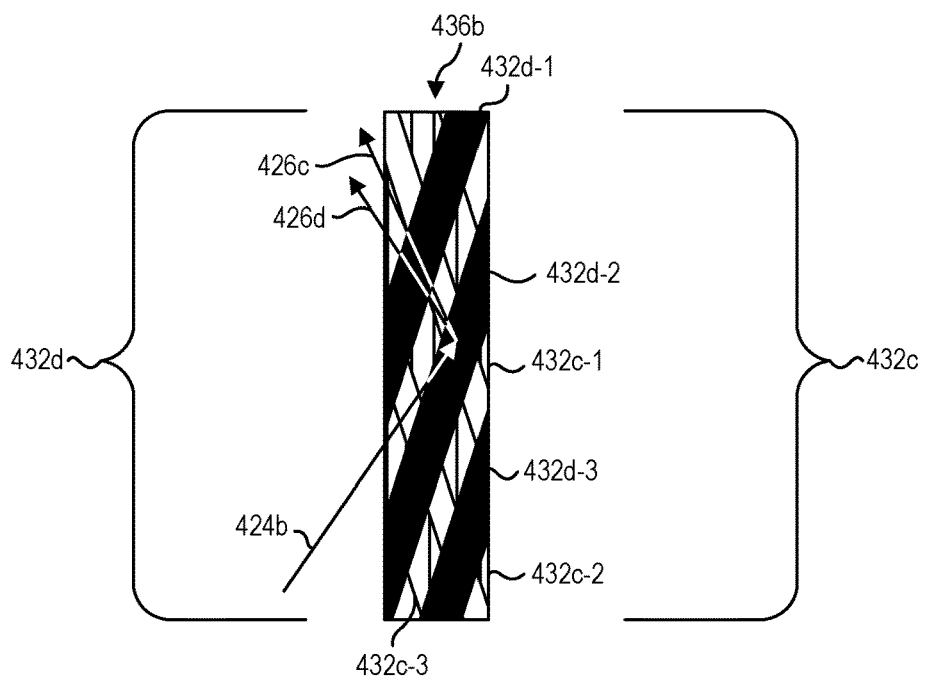
FIG. 4B illustrates an example duplex wideband grating in which two sets of non-symmetric Bragg planes diffract incident light in a reflection configuration and are located in a single volume.

The Bragg planes 432c, 432d may both reside in a single volume or medium. The Bragg planes 432c may intersect with the Bragg planes 432d within the single volume or medium of the duplex wideband grating 436b. The Bragg planes 432c, 432d may be non-symmetric or tilted. In other designs, one of the Bragg planes 432c, 432d may be symmetric. In other words, although the Bragg planes 432c, 432d shown in FIG. 4B are non-symmetric, in other designs a duplex wideband grating having two or more diffraction elements in a single volume that diffract incident light in a reflection configuration may include a set of Bragg planes (or other diffraction element) that is symmetric.

The Bragg planes 432c may have a first orientation relative to a surface of the duplex wideband grating 436b. The Bragg planes 432d may have a second orientation relative to a surface of the duplex wideband grating 436b. The first orientation may be different from the second orientation. The first orientation may impact operating characteristics of the Bragg planes 432c. The second orientation may impact operating characteristics of the Bragg planes 432d. The operating characteristics may include diffraction efficiency, bandwidth, one or more peak diffraction efficiencies, one or more particular wavelengths at which the one or more peak diffraction efficiencies occur, angle of dispersion, and angle of diffraction.

The Bragg planes 432c may have a first spatial frequency. The Bragg planes 432d may have a second spatial frequency. The first spatial frequency may be equal to the second spatial frequency. The first spatial frequency and the second spatial frequency may impact the operating characteristics of the Bragg planes 432c and the Bragg planes 432d respectively.

The Bragg planes 432c may have a first index of refraction. The Bragg planes 432d may have a second index of refraction. The regions between the Bragg planes 432c and the regions between the Bragg planes 432d may have a third index of refraction lower than the first index of refraction and the second index of refraction. The first index of refraction may be different from the second index of refraction. The first index of refraction and the second index of refraction may impact the operating characteristics of the Bragg planes 432c and the Bragg planes 432d respectively. A first difference may exist between the first index of refraction and the third index of refraction. A second difference may exist between the second index of refraction and the third index of refraction. The first difference and the second difference may impact the operating characteristics of the Bragg planes 432c and the Bragg planes 432d respectively. A first average may exist between the first index of refraction and the third index of refraction. A second average may exist between the second index of refraction and the third index of refraction. The first average and the second average may impact operating characteristics of the Bragg planes 432c and the Bragg planes 432d respectively.

The Bragg planes 432c, 432d may have tilts (and/or other operating characteristics) such that the Bragg planes 432c, 432d diffract incident light 424b in a reflection configuration. The incident light 424b may enter the duplex wideband grating 436b. The duplex wideband grating 436b may diffract the incident light 424b to generate diffracted light 426c, 426d. The Bragg planes 432c may diffract the incident light 424b to generate the diffracted light 426c. The Bragg planes 432d may diffract the incident light 424b to generate the diffracted light 426d. The diffracted light 426c may have an angle of diffraction different from an angle of incidence of the incident light 424b. The diffracted light 426d may have an angle of diffraction different from the angle of incidence of the incident light 424b. The diffracted light 426c may have an angle of diffraction different from an angle of diffraction of the diffracted light 426d.

The first diffraction element and the second diffraction element may be designed to minimize interaction between the first diffraction element and the second diffraction element. For example, the Bragg planes 432c, 432d may be designed such that the Bragg planes 432c diffract incident light with a same dispersion between wavelengths as the Bragg planes 432d. As another example, the Bragg planes 432c, 432d may be designed such that the Bragg planes 432c diffract a first portion of spectrum and the Bragg planes 432d diffract a second portion of the spectrum that is not identical to the first portion. As another example, the Bragg planes 432d may be designed to not diffract light (or to diffract light with a diffraction efficiency below a threshold) that is diffracted by the Bragg planes 432c.

The duplex wideband grating 436b may have a diffraction efficiency, one or more peak diffraction efficiencies, a bandwidth, an average diffraction efficiency, and a minimum diffraction efficiency as described above with respect to the duplex wideband grating 436. As with the duplex wideband grating 436, the duplex wideband grating 436b may have operating characteristics different from (and superior to) any of the individual volume phase holographic gratings (or sets of Bragg planes) included in the duplex wideband grating 436b. For example, the duplex wideband grating 436b may have a diffraction efficiency, one or more peaks in diffraction efficiency, a bandwidth, an average diffraction efficiency, and a minimum diffraction efficiency different from (and superior to) any of the individual volume phase holographic gratings (or sets of Bragg planes) included in the duplex wideband grating 436b.

Figure 4C:
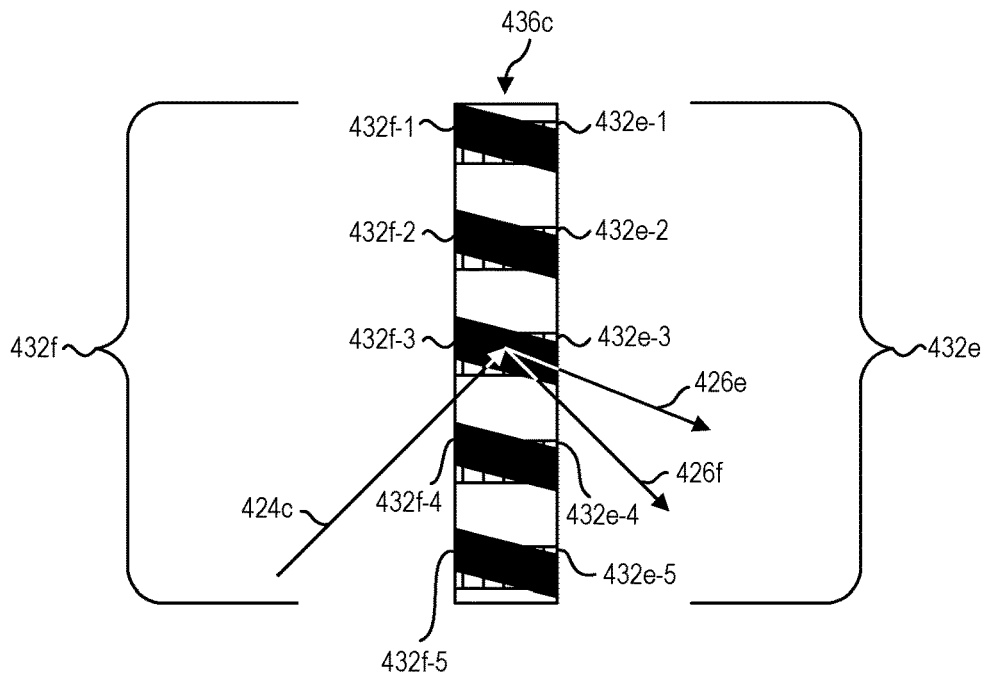
FIG. 4C illustrates an example duplex wideband grating in which a set of non-symmetric Bragg planes and a set of symmetric Bragg planes are located in a single volume.

Although the Bragg planes 432a, 432b shown in FIG. 4A are non-symmetric, in other designs a duplex wideband grating having two or more diffraction elements in a single volume that transmits incident light may include a set of Bragg planes (or other diffraction element) that is symmetric. In other words, in other designs, one of the Bragg planes 432a, 432b may be symmetric instead of non-symmetric. For example, in FIG. 4C a duplex wideband grating 436c may include a first diffraction element and a second diffraction element in a single volume. The first diffraction element may include Bragg planes 432e (which may include Bragg planes 432e-1, 432e-2, 432e-3, 432e-4, 432e-5), and the second diffraction element may include Bragg planes 432f (which may include Bragg planes 432f-1, 432f-2, 432f-3, 432f-4, 432f-5).

The Bragg planes 432e, 432f may both reside in a single volume or medium. The Bragg planes 432e may intersect with the Bragg planes 432f within the single volume or medium of the duplex wideband grating 436c. The Bragg planes 432f may be non-symmetric or tilted. The Bragg planes 432e may be symmetric. The orientations of the Bragg planes 432e, 432f may impact operating characteristics of the Bragg planes 432e, 432f. The operating characteristics may include diffraction efficiency, bandwidth, one or more peak diffraction efficiencies, one or more particular wavelengths at which the one or more peak diffraction efficiencies occur, angle of dispersion, and angle of diffraction.

The Bragg planes 432e may have a first spatial frequency. The Bragg planes 432f may have a second spatial frequency. The first spatial frequency may be equal to the second spatial frequency. The first spatial frequency and the second spatial frequency may impact the operating characteristics of the Bragg planes 432e and the Bragg planes 432f respectively.

The Bragg planes 432e may have a first index of refraction. The Bragg planes 432f may have a second index of refraction. The regions between the Bragg planes 432e and the regions between the Bragg planes 432f may have a third index of refraction lower than the first index of refraction and the second index of refraction. The first index of refraction may be different from the second index of refraction. The first index of refraction and the second index of refraction may impact the operating characteristics of the Bragg planes 432e and the Bragg planes 432f respectively. A first difference may exist between the first index of refraction and the third index of refraction. A second difference may exist between the second index of refraction and the third index of refraction. The first difference and the second difference may impact the operating characteristics of the Bragg planes 432e and the Bragg planes 432f respectively. A first average may exist between the first index of refraction and the third index of refraction. A second average may exist between the second index of refraction and the third index of refraction. The first average and the second average may impact operating characteristics of the Bragg planes 432e and the Bragg planes 432f respectively.

Incident light 424c may enter the duplex wideband grating 436c. The duplex wideband grating 436c may diffract the incident light 424c to generate diffracted light 426e, 426f. The Bragg planes 432e may diffract the incident light 424c to generate the diffracted light 426e. The Bragg planes 432f may diffract the incident light 424c to generate the diffracted light 426f. The diffracted light 426e may have an angle of diffraction identical to an angle of incidence of the incident light 424c. The diffracted light 426f may have an angle of diffraction different from the angle of incidence of the incident light 424c. The diffracted light 426e may have an angle of diffraction different from an angle of diffraction of the diffracted light 426f.

The Bragg planes 432e, 432f may be designed to minimize interaction between the Bragg planes 432e and the Bragg planes 432f. For example, the Bragg planes 432e, 432f may be designed such that the Bragg planes 432e diffract incident light with a same dispersion between wavelengths as the Bragg planes 432f. As another example, the Bragg planes 432e, 432f may be designed such that the Bragg planes 432e diffract a first portion of spectrum and the Bragg planes 432f diffract a second portion of the spectrum that is not identical to the first portion. As another example, the Bragg planes 432f may be designed to not diffract light (or to diffract light with a diffraction efficiency below a threshold) that is diffracted by the Bragg planes 432e.

The duplex wideband grating 436c may have a diffraction efficiency, one or more peak diffraction efficiencies, a bandwidth, an average diffraction efficiency, and a minimum diffraction efficiency as described above with respect to the duplex wideband grating 436. As with the duplex wideband grating 436, the duplex wideband grating 436c may have operating characteristics different from (and superior to) any of the individual volume phase holographic gratings (or sets of Bragg planes) included in the duplex wideband grating 436c. For example, the duplex wideband grating 436c may have a diffraction efficiency, one or more peaks in diffraction efficiency, a bandwidth, an average diffraction efficiency, and a minimum diffraction efficiency different from (and superior to) any of the individual volume phase holographic gratings (or sets of Bragg planes) included in the duplex wideband grating 436c.

Figure 4D:
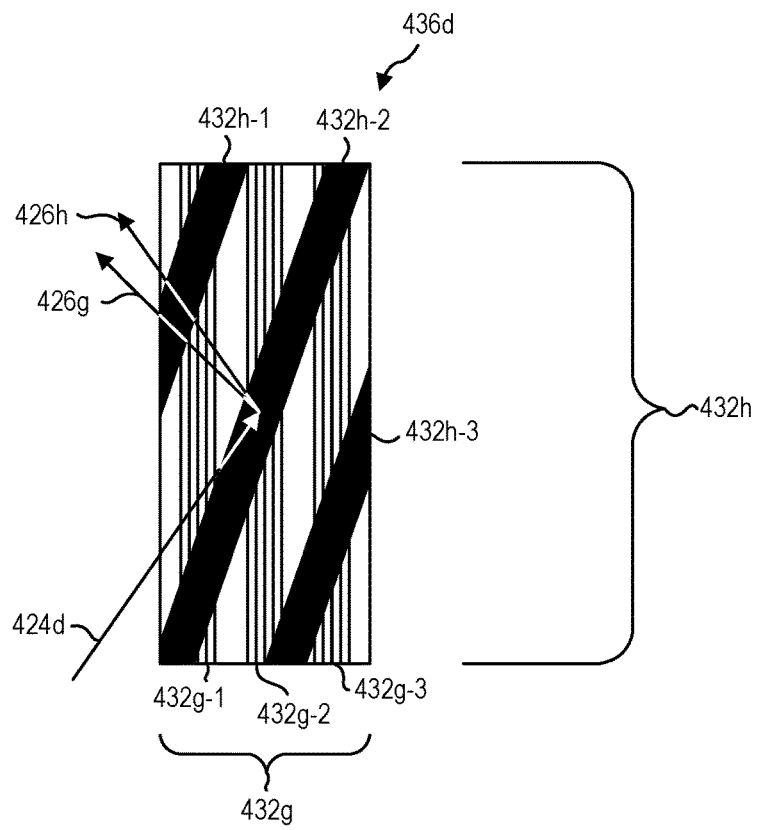
FIG. 4D illustrates an example duplex wideband grating in which a set of non-symmetric Bragg planes and a set of symmetric Bragg planes diffract incident light in a reflection configuration and are located in a single volume.

FIG. 4D illustrates a duplex wideband grating 436d that includes a first diffraction element and a second diffraction element in a single volume. The first diffraction element may be a reflection volume phase holographic grating, and the second diffraction element may be a reflection volume phase holographic grating. The first diffraction element may include Bragg planes 432g (which may include Bragg planes 432g-1, 432g-2, 432g-3), and the second diffraction element may include Bragg planes 432h (which may include Bragg planes 432h-1, 432h-2, 432h-3).

The Bragg planes 432g, 432h may both reside in a single volume or medium. The Bragg planes 432g may intersect with the Bragg planes 432h within the single volume or medium of the duplex wideband grating 436d. The Bragg planes 432g may be symmetric in a reflection configuration. The Bragg planes 432h may be non-symmetric or tilted. Thus, FIG. 4D illustrates a duplex wideband grating having two or more diffraction elements in a single volume that diffract incident light in a reflection configuration with at least one set of Bragg planes (or other diffraction element) that is symmetric in a reflection configuration.

The Bragg planes 432g may have a first orientation relative to a surface of the duplex wideband grating 436d. The Bragg planes 432h may have a second orientation relative to a surface of the duplex wideband grating 436d. The first orientation may be different from the second orientation. The first orientation may impact operating characteristics of the Bragg planes 432g. The second orientation may impact operating characteristics of the Bragg planes 432h. The operating characteristics may include diffraction efficiency, bandwidth, one or more peak diffraction efficiencies, one or more particular wavelengths at which the one or more peak diffraction efficiencies occur, angle of dispersion, and angle of diffraction.

The Bragg planes 432g may have a first spatial frequency. The Bragg planes 432h may have a second spatial frequency. The first spatial frequency may be equal to the second spatial frequency. The first spatial frequency and the second spatial frequency may impact the operating characteristics of the Bragg planes 432g and the Bragg planes 432h respectively.

The Bragg planes 432g may have a first index of refraction. The Bragg planes 432h may have a second index of refraction. The regions between the Bragg planes 432g and the regions between the Bragg planes 432h may have a third index of refraction lower than the first index of refraction and lower than the second index of refraction. The first index of refraction may be different from the second index of refraction. The first index of refraction and the second index of refraction may impact the operating characteristics of the Bragg planes 432g and the Bragg planes 432h respectively. A first difference may exist between the first index of refraction and the third index of refraction. A second difference may exist between the second index of refraction and the third index of refraction. The first difference and the second difference may impact the operating characteristics of the Bragg planes 432g and the Bragg planes 432h respectively. A first average may exist between the first index of refraction and the third index of refraction. A second average may exist between the second index of refraction and the third index of refraction. The first average and the second average may impact operating characteristics of the Bragg planes 432g and the Bragg planes 432h respectively.

The Bragg planes 432g, 432h may have tilts (and/or other operating characteristics) such that the Bragg planes 432g, 432h diffract incident light 424d in a reflection configuration. The incident light 424d may enter the duplex wideband grating 436d. The duplex wideband grating 436d may diffract the incident light 424d to generate diffracted light 426g, 426h. The Bragg planes 432g may diffract the incident light 424d to generate the diffracted light 426g. The Bragg planes 432h may diffract the incident light 424d to generate the diffracted light 426h. The diffracted light 426g may have an angle of diffraction identical to an angle of incidence of the incident light 424d. The diffracted light 426h may have an angle of diffraction different from the angle of incidence of the incident light 424d. The diffracted light 426g may have an angle of diffraction different from an angle of diffraction of the diffracted light 426h.

The first diffraction element and the second diffraction element may be designed to minimize interaction between the first diffraction element and the second diffraction element. For example, the Bragg planes 432g, 432h may be designed such that the Bragg planes 432g diffract incident light with a same dispersion between wavelengths as the Bragg planes 432h. As another example, the Bragg planes 432g, 432h may be designed such that the Bragg planes 432g diffract a first portion of spectrum and the Bragg planes 432h diffract a second portion of the spectrum that is not identical to the first portion. As another example, the Bragg planes 432h may be designed to not diffract light (or to diffract light with a diffraction efficiency below a threshold) that is diffracted by the Bragg planes 432g.

The duplex wideband grating 436d may have a diffraction efficiency, one or more peak diffraction efficiencies, a bandwidth, an average diffraction efficiency, and a minimum diffraction efficiency as described above with respect to the duplex wideband grating 436. As with the duplex wideband grating 436, the duplex wideband grating 436d may have operating characteristics different from (and superior to) any of the individual volume phase holographic gratings (or sets of Bragg planes) included in the duplex wideband grating 436d. For example, the duplex wideband grating 436d may have a diffraction efficiency, one or more peaks in diffraction efficiency, a bandwidth, an average diffraction efficiency, and a minimum diffraction efficiency different from (and superior to) any of the individual volume phase holographic gratings (or sets of Bragg planes) included in the duplex wideband grating 436d.

Figure 5A:
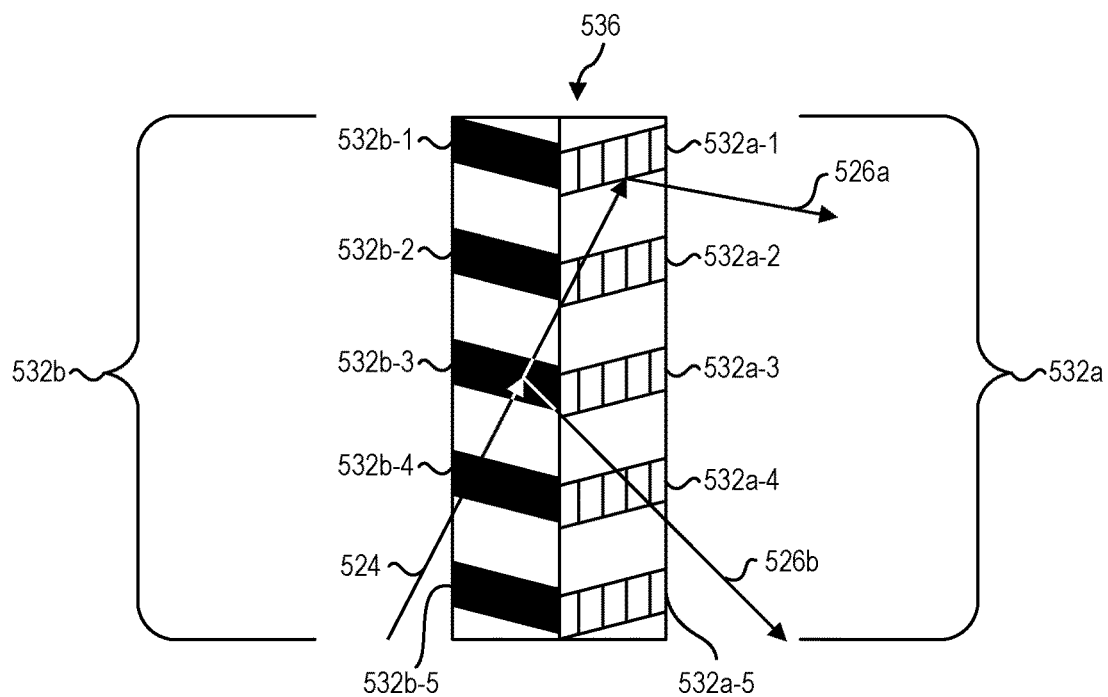
FIG. 5A illustrates an example duplex wideband grating in which two sets of non-symmetric Bragg planes are located in separate, sequential volumes.

FIG. 5A illustrates an example duplex wideband grating 536. The duplex wideband grating 536 may include two diffraction elements in two separate volumes. The duplex wideband grating 536 may include Bragg planes 532a, 532b. The Bragg planes 532a, 532b may occupy separate volumes (a first volume and a second volume). The separate volumes may be separate structures. For example, the separate volumes may be separate crystal structures or separate gelatin structures. The separate volumes may be capable of operating as independent diffraction gratings. The separate volumes may be adjacent. One face of the first volume may contact one face of the second volume. The Bragg planes 532a may include Bragg planes 532a-1, 532a-2, 532a-3, 532a-4, 532a-5. The Bragg planes 532b may include Bragg planes 532b-1, 532b-2, 532b-3, 532b-4, 532b-5. The Bragg planes 532a may not intersect with the Bragg planes 532b.

Incident light 524 may enter the duplex wideband grating 536. The duplex wideband grating 536 may diffract the incident light 524 to generate diffracted light 526a, 526b. The Bragg planes 532a may diffract the incident light 524 to generate the diffracted light 526a. The Bragg planes 532b may diffract the incident light 524 to generate the diffracted light 526b. The diffracted light 526a may have an angle of diffraction different from an angle of diffraction of the diffracted light 526b.

The Bragg planes 532a may have characteristics identical to the Bragg planes 432a except that the Bragg planes 532a do not intersect the Bragg planes 532b and reside in a volume separate from the Bragg planes 532b. The Bragg planes 532b may have characteristics identical to the Bragg planes 432b except that the Bragg planes 532b do not intersect the Bragg planes 532a and reside in a volume separate from the Bragg planes 532a. Furthermore, the regions between the Bragg planes 532b may have an index of refraction different from an index of refraction of the regions between the Bragg planes 532a.

The duplex wideband grating 536 may have a diffraction efficiency and a bandwidth identical to the duplex wideband grating 436. The duplex wideband grating 536 may have two or more peaks in diffraction efficiency identical to the duplex wideband grating 436. The duplex wideband grating 536 may have a minimum diffraction efficiency within a defined bandwidth identical to the duplex wideband grating 436. The duplex wideband grating 536 may have an average diffraction efficiency across a defined bandwidth identical to the duplex wideband grating 436.

Figure 5B:
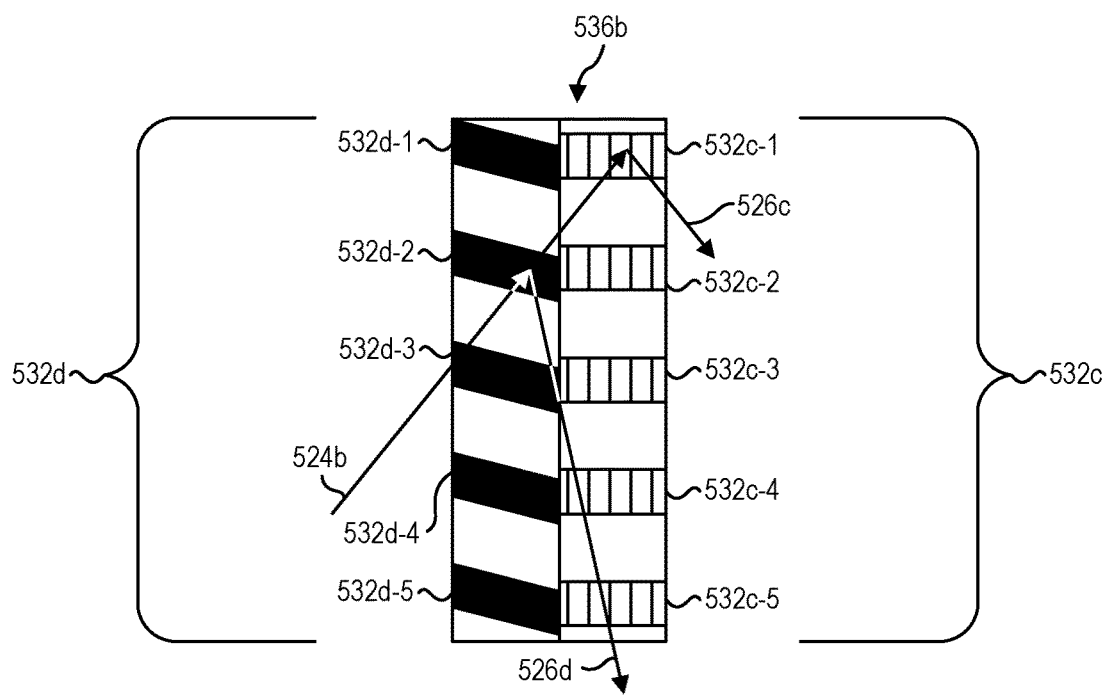
FIG. 5B illustrates an example duplex wideband grating in which one set of non-symmetric Bragg planes and one set of symmetric Bragg planes are located in separate, sequential volumes.

Although the Bragg planes 532a, 532b shown in FIG. 5A are non-symmetric, in other designs a duplex wideband grating may include a set of Bragg planes (or other diffraction element) that is symmetric. In other words, in other designs, one of the Bragg planes 532a, 532b may be symmetric instead of non-symmetric. FIG. 5B illustrates an example duplex wideband grating 536b that includes a set of symmetric Bragg planes. The duplex wideband grating 536b may include two diffraction elements in two separate volumes (although in other designs, the two diffraction elements could be in a single volume). The duplex wideband grating 536b may include Bragg planes 532c, 532d. The Bragg planes 532c, 532d may occupy separate volumes (a first volume and a second volume). The separate volumes may be separate structures. For example, the separate volumes may be separate crystal structures or separate gelatin structures. The separate volumes may be capable of operating as independent diffraction gratings. The separate volumes may be adjacent. One face of the first volume may contact one face of the second volume. The Bragg planes 532c may include Bragg planes 532c-1, 532c-2, 532c-3, 532c-4, 532c-5. The Bragg planes 532d may include Bragg planes 532d-1, 532d-2, 532d-3, 532d-4, 532d-5. The Bragg planes 532c may not intersect with the Bragg planes 532d.

Incident light 524b may enter the duplex wideband grating 536b. The duplex wideband grating 536b may diffract the incident light 524b to generate diffracted light 526c, 526d. The Bragg planes 532c may diffract the incident light 524b to generate the diffracted light 526c. The Bragg planes 532d may diffract the incident light 524b to generate the diffracted light 526d. The diffracted light 526c may have an angle of diffraction different from an angle of diffraction of the diffracted light 526d. The diffracted light 526c may have an angle of diffraction identical to an angle of incidence of the incident light 524b.

The Bragg planes 532c may have characteristics identical to the Bragg planes 432e except that the Bragg planes 532c do not intersect the Bragg planes 532d and reside in a volume separate from the Bragg planes 532d. The Bragg planes 532d may have characteristics identical to the Bragg planes 432f except that the Bragg planes 532d do not intersect the Bragg planes 532c and reside in a volume separate from the Bragg planes 532c. Furthermore, the regions between the Bragg planes 532d may have an index of refraction different from an index of refraction of the regions between the Bragg planes 532c.

The duplex wideband grating 536b may have a diffraction efficiency, a bandwidth, a minimum diffraction efficiency within a defined bandwidth, an average diffraction efficiency across a defined bandwidth, and two or more peaks in diffraction efficiency identical to the duplex wideband grating 436c. As with the duplex wideband grating 436, the duplex wideband grating 536b may have operating characteristics different from (and superior to) any of the individual volume phase holographic gratings (or sets of Bragg planes) included in the duplex wideband grating 536b. For example, the duplex wideband grating 536b may have a diffraction efficiency, one or more peaks in diffraction efficiency, a bandwidth, an average diffraction efficiency, and a minimum diffraction efficiency different from (and superior to) any of the individual volume phase holographic gratings (or sets of Bragg planes) included in the duplex wideband grating 536b.

Although the duplex wideband grating 536 shown in FIG. 5A transmits the incident light 524 and the duplex wideband grating 536b shown in FIG. 5B transmits the incident light 524b, in other designs a duplex wideband grating having two diffraction elements in two separate volumes may diffract incident light in a reflection configuration. For example, in FIG. 5C a duplex wideband grating 536c may include a first diffraction element in a first volume and a second diffraction element in a second volume separate from the first volume. The first diffraction element may be a reflection volume phase holographic grating, and the second diffraction element may be a reflection volume phase holographic grating. The first diffraction element may include Bragg planes 532e (which may include Bragg planes 532e-1, 532e-2, 532e-3, 532e-4, 532e-5), and the second diffraction element may include Bragg planes 532f (which may include Bragg planes 532f-1, 532f-2, 532f-3, 532f-4, 532f-5). The Bragg planes 532e and the Bragg planes 532f may have tilts (and/or other operating characteristics) such that the Bragg planes 532e, 532f diffract the incident light 524 in a reflection configuration.

The Bragg planes 532e, 532f may occupy separate volumes (a first volume and a second volume). The separate volumes may be separate structures. For example, the separate volumes may be separate crystal structures or separate gelatin structures. The separate volumes may be capable of operating as independent diffraction gratings. The separate volumes may be adjacent. One face of the first volume may contact one face of the second volume. The Bragg planes 532e may not intersect with the Bragg planes 532f.

Figure 5C:
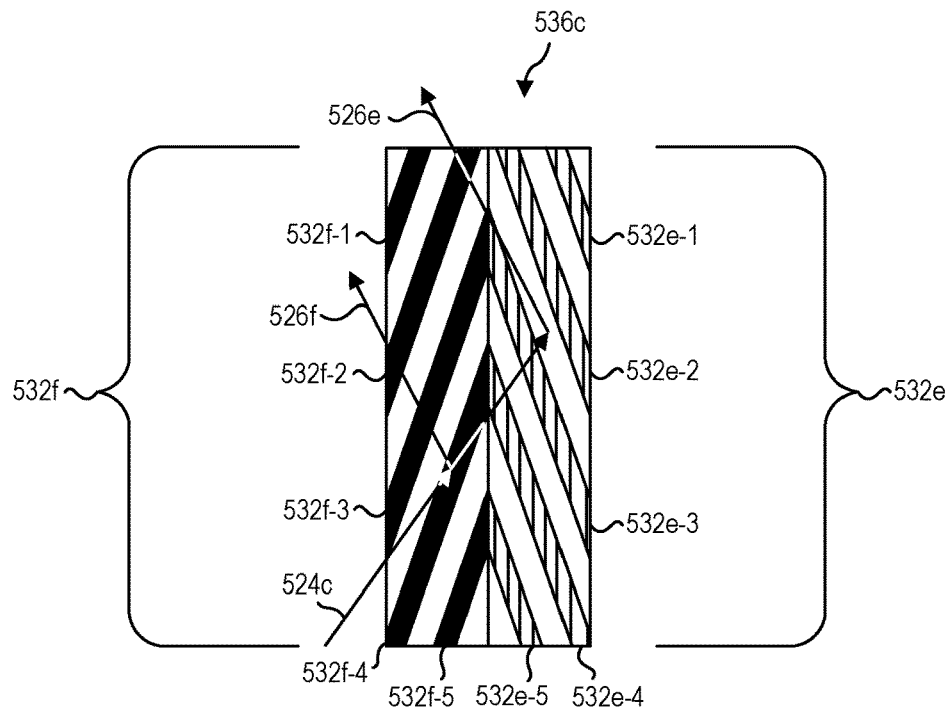
FIG. 5C illustrates an example duplex wideband grating in which two sets of non-symmetric Bragg planes diffract incident light in a reflection configuration and are located in separate, sequential volumes.

Incident light 524c may enter the duplex wideband grating 536c. The duplex wideband grating 536c may diffract the incident light 524c to generate diffracted light 526e, 526f. The Bragg planes 532e may diffract the incident light 524c to generate the diffracted light 526e. The Bragg planes 532f may diffract the incident light 524c to generate the diffracted light 526f. The diffracted light 526e may have an angle of diffraction different from an angle of diffraction of the diffracted light 526f. The diffracted light 526e and the diffracted light 526f may have angles of diffraction different from an angle of incidence of the incident light 524c. Although FIG. 5C shows two sets of non-symmetric Bragg planes, in other designs, one of the Bragg planes 532e or the Bragg planes 532f may be symmetric.

The Bragg planes 532e may have characteristics identical to the Bragg planes 432c except that the Bragg planes 532e do not intersect the Bragg planes 532f and reside in a volume separate from the Bragg planes 532f. The Bragg planes 532f may have characteristics identical to the Bragg planes 432d except that the Bragg planes 532f do not intersect the Bragg planes 532e and reside in a volume separate from the Bragg planes 532e. Furthermore, the regions between the Bragg planes 532f may have an index of refraction different from an index of refraction of the regions between the Bragg planes 532e.

The duplex wideband grating 536c may have a diffraction efficiency and a bandwidth identical to the duplex wideband grating 436b. The duplex wideband grating 536c may have a minimum diffraction efficiency within a defined bandwidth identical to the duplex wideband grating 436b. The duplex wideband grating 536c may have an average diffraction efficiency across a defined bandwidth identical to the duplex wideband grating 436b.

The duplex wideband grating 536c may have a diffraction efficiency, one or more peak diffraction efficiencies, a bandwidth, an average diffraction efficiency, and a minimum diffraction efficiency as described above with respect to the duplex wideband grating 536. As with the duplex wideband grating 536, the duplex wideband grating 536c may have operating characteristics different from (and superior to) any of the individual volume phase holographic gratings (or sets of Bragg planes) included in the duplex wideband grating. For example, the duplex wideband grating 536c may have a diffraction efficiency, one or more peaks in diffraction efficiency, a bandwidth, an average diffraction efficiency, and a minimum diffraction efficiency different from (and superior to) any of the individual volume phase holographic gratings (or sets of Bragg planes) included in the duplex wideband grating 536c.

Although the duplex wideband grating 536 shown in FIG. 5A includes two sets of Bragg planes and the duplex wideband grating 536b shown in FIG. 5B includes two sets of Bragg planes, in other designs a duplex wideband grating may include three or more sets of Bragg planes.

Figure 5D:
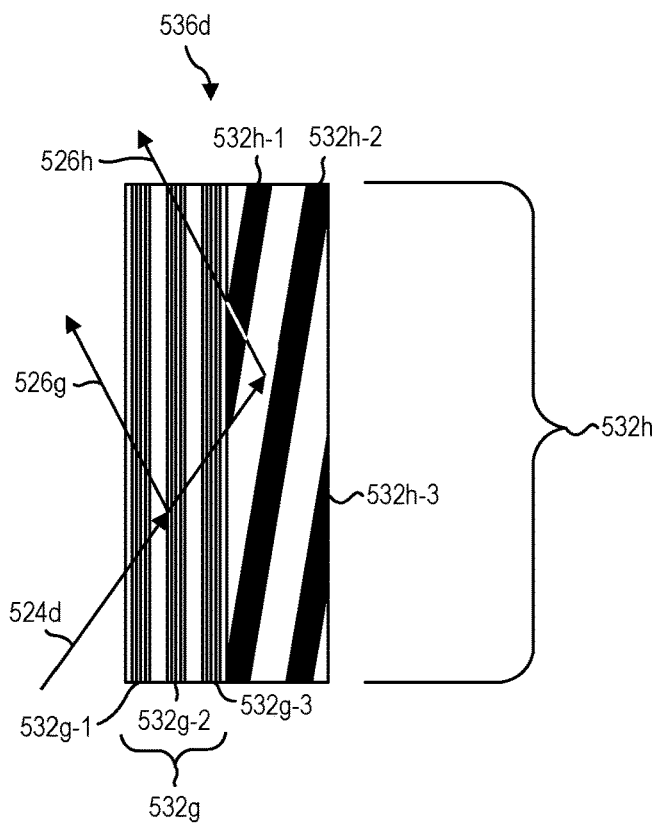
FIG. 5D illustrates an example duplex wideband grating in which a set of non-symmetric Bragg planes and a set of symmetric Bragg planes diffract incident light in a reflection configuration and are located in separate, sequential volumes.

FIG. 5D illustrates an example duplex wideband grating 536d that includes a set of symmetric Bragg planes. The duplex wideband grating 536d may include a first diffraction element in a first volume and a second diffraction element in a second volume separate from the first volume. The first diffraction element may be a reflection volume phase holographic grating, and the second diffraction element may be a reflection volume phase holographic grating. The duplex wideband grating 536d may include Bragg planes 532g, 532h. The Bragg planes 532g, 532h may occupy separate volumes (a first volume and a second volume). The separate volumes may be separate structures. For example, the separate volumes may be separate crystal structures or separate gelatin structures. The separate volumes may be capable of operating as independent diffraction gratings. The separate volumes may be adjacent. One face of the first volume may contact one face of the second volume. The Bragg planes 532g may include Bragg planes 532g-1, 532g-2, 532g-3. The Bragg planes 532h may include Bragg planes 532h-1, 532h-2, 532h-3. The Bragg planes 532g may not intersect with the Bragg planes 532h. The Bragg planes 532g and the Bragg planes 532h may be designed to minimize interaction between the Bragg planes 532g, 532h.

Incident light 524d may enter the duplex wideband grating 536d. The duplex wideband grating 536d may diffract the incident light 524d to generate diffracted light 526g, 526h. The Bragg planes 532g may diffract the incident light 524d to generate the diffracted light 526g. The Bragg planes 532h may diffract the incident light 524d to generate the diffracted light 526h. The diffracted light 526g may have an angle of diffraction different from an angle of diffraction of the diffracted light 526h. The diffracted light 526g may have an angle of diffraction identical to an angle of incidence of the incident light 524d.

The Bragg planes 532g may have characteristics identical to the Bragg planes 432g except that the Bragg planes 532g do not intersect the Bragg planes 532h and reside in a volume separate from the Bragg planes 532h. The Bragg planes 532h may have characteristics identical to the Bragg planes 432h except that the Bragg planes 532h do not intersect the Bragg planes 532g and reside in a volume separate from the Bragg planes 532g. Furthermore, the regions between the Bragg planes 532g may have an index of refraction different from an index of refraction of the regions between the Bragg planes 532h.

The duplex wideband grating 536d may have a diffraction efficiency, a bandwidth, a minimum diffraction efficiency within a defined bandwidth, an average diffraction efficiency across a defined bandwidth, and two or more peaks in diffraction efficiency identical to the duplex wideband grating 436d. As with the duplex wideband grating 436, the duplex wideband grating 536d may have operating characteristics different from (and superior to) any of the individual volume phase holographic gratings (or sets of Bragg planes) included in the duplex wideband grating 536d. For example, the duplex wideband grating 536d may have a diffraction efficiency, one or more peaks in diffraction efficiency, a bandwidth, an average diffraction efficiency, and a minimum diffraction efficiency different from (and superior to) any of the individual volume phase holographic gratings (or sets of Bragg planes) included in the duplex wideband grating 536d.

Figure 6A:
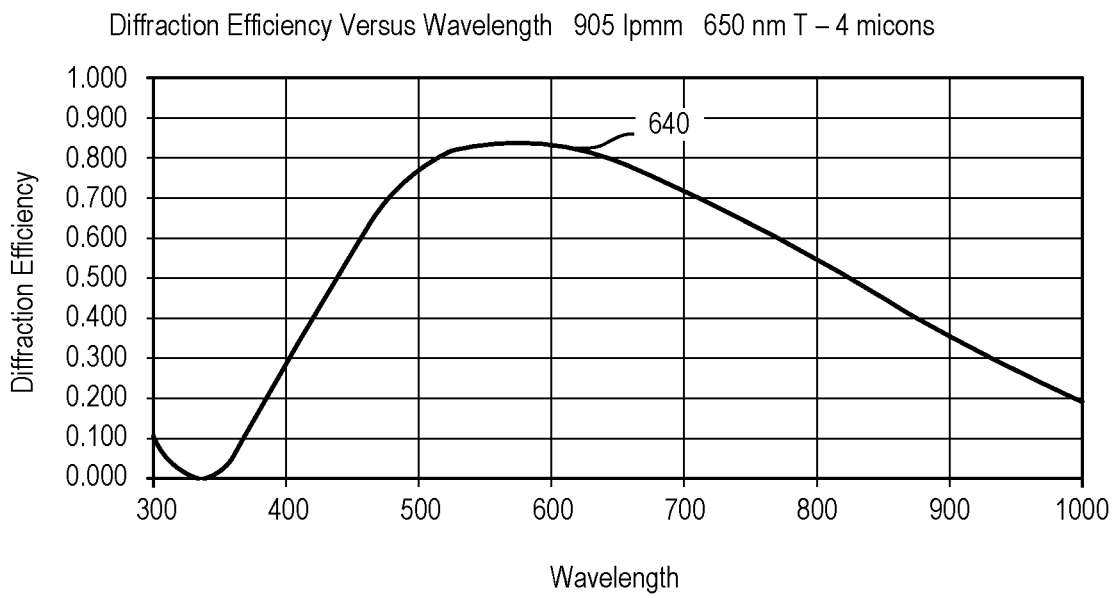
FIG. 6A illustrates an example diffraction efficiency curve for a volume phase holographic grating.

FIG. 6A illustrates an example diffraction efficiency curve 640 for a volume phase holographic grating (such as the volume phase holographic grating 220). The diffraction efficiency curve 640 may represent an average of the diffraction efficiency for s polarized light and the diffraction efficiency for p polarized light. The diffraction efficiency curve 640 may have a peak diffraction efficiency around a wavelength of 550 nm. The volume phase holographic grating may be designed to have a peak diffraction efficiency at that wavelength.

Figure 6B:
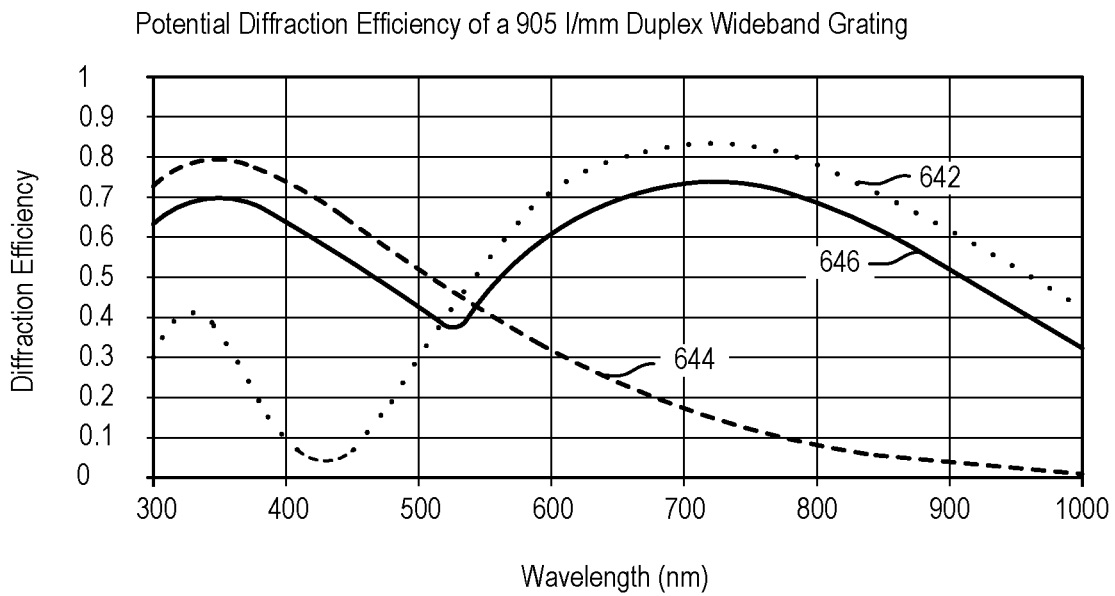
FIG. 6B illustrates an example diffraction efficiency curve for a duplex wideband grating.

FIG. 6B illustrates example diffraction efficiency curves for a duplex wideband grating (such as the duplex wideband grating 436 or the duplex wideband grating 536), a blue grating included in the duplex wideband grating (which may include Bragg planes such as the Bragg planes 432a or the Bragg planes 532a), and a red grating included in the duplex wideband grating (which may include Bragg planes such as the Bragg planes 432*b* or the Bragg planes 532*b*). The duplex wideband grating may include the Bragg planes included in the red grating and the blue grating. The Bragg planes may be in a same volume or in separate, sequential volumes. The duplex wideband grating may have a spatial frequency of 905 lines per millimeter. A diffraction efficiency curve 646 of the duplex wideband grating is shown as a solid line, a diffraction efficiency curve 644 of the blue grating is shown as a dashed line, and a diffraction efficiency curve 642 of the red grating is shown as a dotted line. These diffraction efficiency curves may be average diffraction efficiencies across multiple polarizations. The red grating and the blue grating may have equal spatial frequencies but different tilts of their Bragg planes. The red grating and the blue grating may achieve a same angle of dispersion between wavelengths. The duplex wideband grating may have a broader bandwidth than either the red grating or the blue grating. The duplex wideband grating may have a higher minimum diffraction efficiency across the bandwidth than either the red grating or the blue grating operating independently. The duplex wideband grating may have a higher average diffraction efficiency across the bandwidth than either the red grating or the blue grating operating independently.

Figure 7:
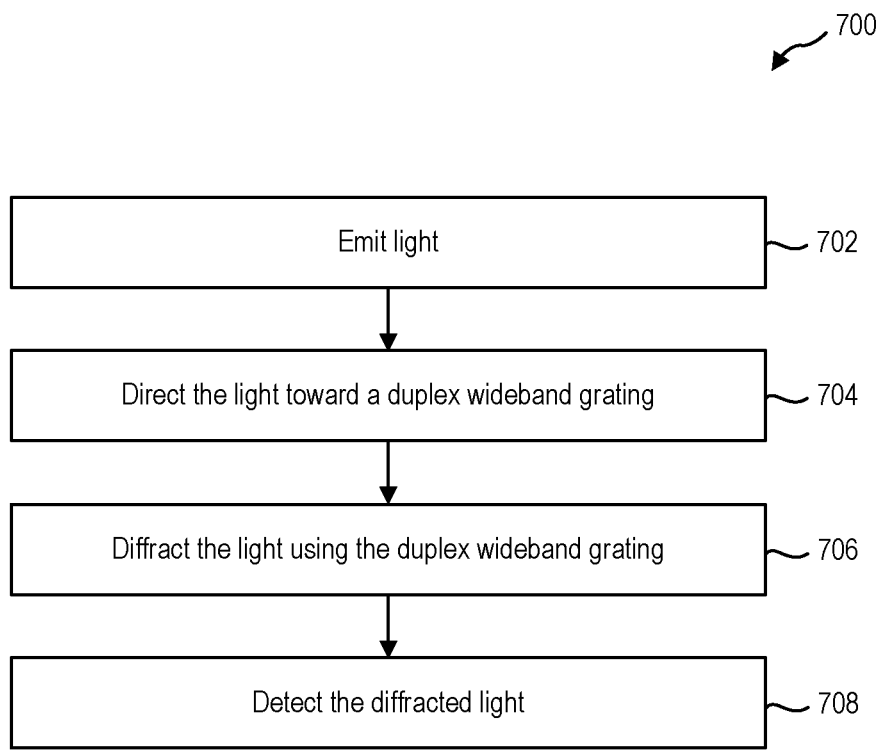
FIG. 7 illustrates an example method for using a duplex wideband grating.

FIG. 7 illustrates an example method 700 for using a duplex wideband grating to perform spectral analysis.

The method 700 may include emitting 702 light. The light may include multiple wavelengths of light. Emitting 702 the light may include emitting 702 the light toward a sample.

The method 700 may include directing 704 the light toward a duplex wideband grating. The duplex wideband grating may be the duplex wideband grating 436 or the duplex wideband grating 536. Directing 704 the light toward the duplex wideband grating may include using a lens to direct the light toward the duplex wideband grating.

The method 700 may include diffracting 706 the light using the duplex wideband grating.

The method 700 may include detecting 708 the diffracted light. Detecting 708 the diffracted light may include detecting one or more properties of component wavelengths of the diffracted light. The one or more properties may include intensity.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A diffraction grating comprising:
   a first non-symmetric diffraction element, wherein the first non-symmetric diffraction element has a peak diffraction efficiency at a first wavelength; and
   a second diffraction element, wherein the second diffraction element has a peak diffraction efficiency at a second wavelength different from the first wavelength and wherein the diffraction grating has a first peak diffraction efficiency at the first wavelength and a second peak diffraction efficiency at the second wavelength.

2. The diffraction grating of claim 1, wherein the first non-symmetric diffraction element and the second diffraction element are volume-phase holographic gratings.

3. The diffraction grating of claim 2, wherein the first non-symmetric diffraction element comprises a first set of Bragg planes having a first tilt.

4. The diffraction grating of claim 3, wherein the second diffraction element is a symmetric diffraction element.

5. The diffraction grating of claim 3, wherein the second diffraction element is a non-symmetric diffraction element and comprises a second set of Bragg planes having a second tilt different from the first tilt.

6. The diffraction grating of claim 5, wherein the first non-symmetric diffraction element and the second diffraction element occupy a same volume.

7. The diffraction grating of claim 4, wherein the first non-symmetric diffraction element occupies a first volume and the second diffraction element occupies a second volume separate from the first volume.

8. The diffraction grating of claim 7, wherein the first volume is adjacent to the second volume.

9. The diffraction grating of claim 4, wherein the first set of Bragg planes has a spatial frequency of more than 900 lines per millimeter.

10. The diffraction grating of claim 1, wherein the first wavelength is between 300 nm and 400 nm and the second wavelength is between 650 nm and 750 nm.

11. The diffraction grating of claim 1, further comprising:
    a third non-symmetric diffraction element, wherein the third non-symmetric diffraction element has a peak diffraction efficiency at a third wavelength different from the first wavelength and the second wavelength and wherein the diffraction grating has a third peak diffraction efficiency at the third wavelength.

12. A spectrometer comprising:
    an opening that receives light;
    a diffraction grating that diffracts at least a portion of the light to generate diffracted light, wherein the diffraction grating comprises:
      a first non-symmetric diffraction element, wherein the first non-symmetric diffraction element has a peak diffraction efficiency at a first wavelength; and
      a second diffraction element, wherein the second diffraction element has a peak diffraction efficiency at a second wavelength different from the first wavelength and wherein the diffraction grating has a first peak diffraction efficiency at the first wavelength and a second peak diffraction efficiency at the second wavelength; and
    a detector that receives at least a portion of the diffracted light.

13. The spectrometer of claim 12, wherein the light has a peak intensity at a peak wavelength and the second wavelength is equal to the peak wavelength.

14. The spectrometer of claim 13, wherein the second diffraction element diffracts the second wavelength away from the detector.

15. The spectrometer of claim 14, wherein the first non-symmetric diffraction element and the second diffraction element occupy a single volume.

16. A diffraction grating comprising:
a first non-symmetric volume phase holographic grating that has a first bandwidth; and
a second volume phase holographic grating that has a second bandwidth that is not identical to the first bandwidth, wherein the diffraction grating has a third bandwidth that is broader than the first bandwidth and the second bandwidth.

17. The diffraction grating of claim 16, wherein the diffraction grating has a higher average diffraction efficiency across the third bandwidth than either the first non-symmetric volume phase holographic grating or the second volume phase holographic grating.

18. The diffraction grating of claim 16, wherein the first non-symmetric volume phase holographic grating comprises a first set of Bragg planes having a first index of refraction and the second volume phase holographic grating is a non-symmetric volume phase holographic grating that comprises a second set of Bragg planes having a second index of refraction different from the first index of refraction.

19. The diffraction grating of claim 16, wherein the first non-symmetric volume phase holographic grating has a first spatial frequency, the second volume phase holographic grating has a second spatial frequency, and the first spatial frequency equals the second spatial frequency.

20. The diffraction grating of claim 19, wherein the first non-symmetric volume phase holographic grating has a first angle of dispersion at an angle of incidence, the second volume phase holographic grating has a second angle of dispersion at the angle of incidence, and the first angle of dispersion equals the second angle of dispersion.

* * * * *